United States Patent
Fujiwara et al.

(10) Patent No.: US 12,054,140 B2
(45) Date of Patent: Aug. 6, 2024

(54) CONTROL DEVICE AND MOVING OBJECT

(71) Applicant: HONDA MOTOR CO., LTD., Tokyo (JP)

(72) Inventors: Tatsuro Fujiwara, Tokyo (JP); Yasushi Shoda, Tokyo (JP); Akiko Sato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/088,267

(22) Filed: Dec. 23, 2022

(65) Prior Publication Data
US 2023/0202462 A1 Jun. 29, 2023

(30) Foreign Application Priority Data
Dec. 27, 2021 (JP) ................................. 2021-213153

(51) Int. Cl.
*B60W 30/06* (2006.01)
*G05D 1/00* (2024.01)

(52) U.S. Cl.
CPC ........... *B60W 30/06* (2013.01); *G05D 1/0016* (2013.01); *B60W 2540/215* (2020.02)

(58) Field of Classification Search
CPC ............ B60W 30/06; B60W 2540/215; G05D 1/0016; G05D 1/0246; B62D 15/0285
See application file for complete search history.

(56) References Cited

U.S. PATENT DOCUMENTS 11,691,619 B2 * 7/2023 Kim ..................... G06V 20/586
701/41
2017/0355307 A1 * 12/2017 Ha ......................... G08G 1/168

FOREIGN PATENT DOCUMENTS

JP 2015-074259 A 4/2015

* cited by examiner

*Primary Examiner* — Daryl C Pope
(74) *Attorney, Agent, or Firm* — Paratus Law Group, PLLC

(57) ABSTRACT

A control device is configured to control a moving object that is moved by automatic steering to a target position specified by a user, the moving object being configured to be movable according to a plurality of types of movement patterns, and moving according to a movement pattern selected by the user from among the plurality of types of movement patterns when moving to the target position. The control device has a first mode and a second mode, and is configured to be switchable between the first mode and the second mode according to an operation of the user. In the first mode, the control device receives selection of the movement pattern after receiving specification of the target position. In the second mode, the control device receives the specification of the target position after receiving the selection of the movement pattern.

7 Claims, 16 Drawing Sheets

(CONT.)

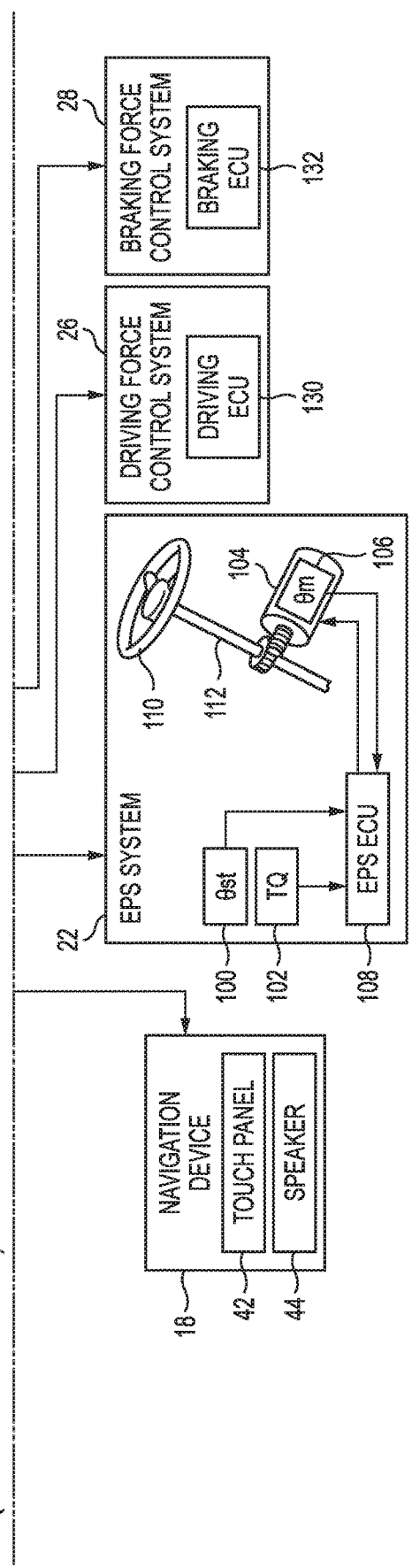

(CONT.)

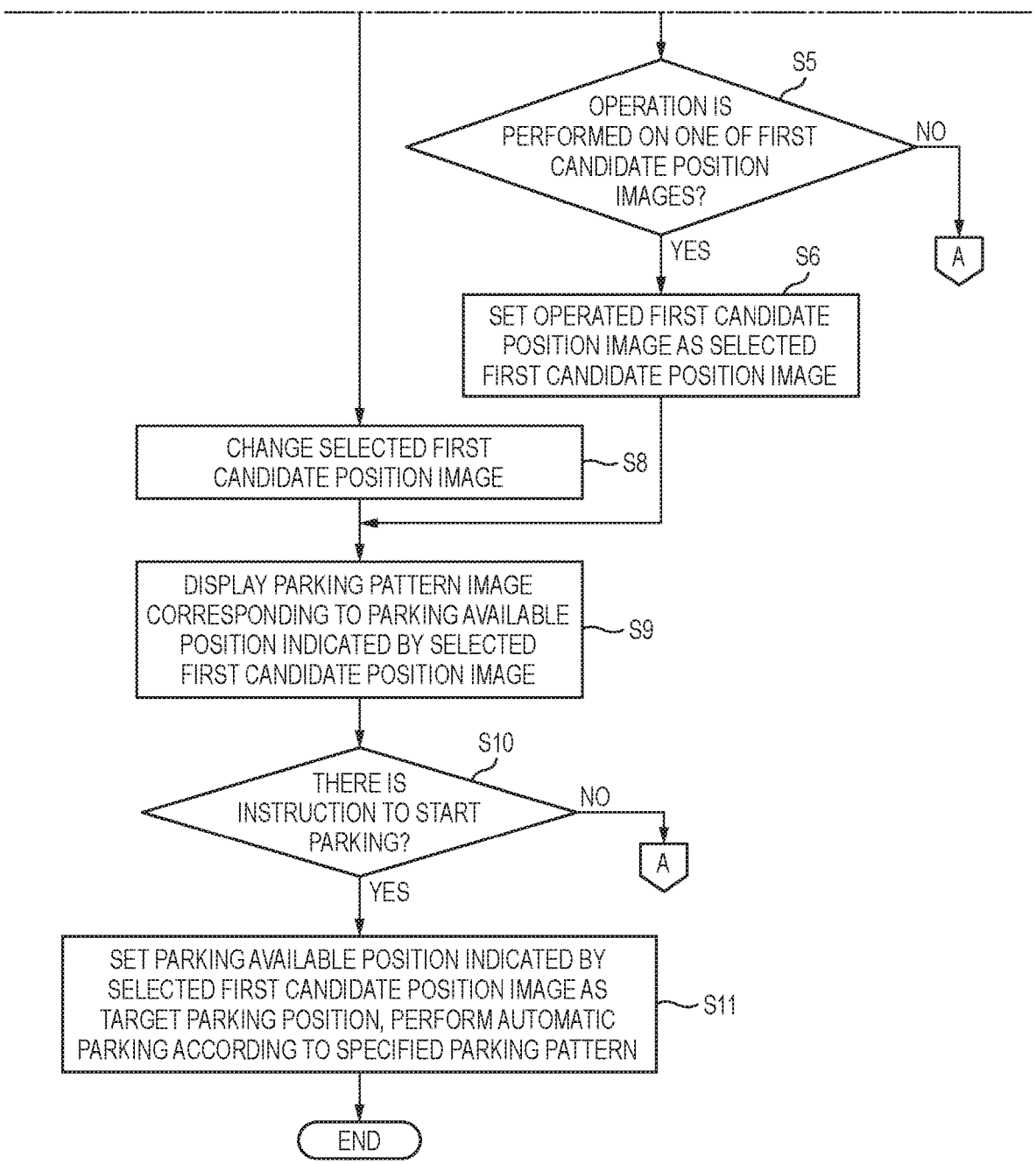

CONTROL DEVICE AND MOVING OBJECT

CROSS-REFERENCE TO RELATED APPLICATIONS

The present application claims the benefit of priority of Japanese Patent Application No. 2021-213153, filed on Dec. 27, 2021, the content of which is incorporated herein by reference.

TECHNICAL FIELD

The present disclosure relates to a control device and a moving object including the control device.

BACKGROUND ART

In recent years, it is required to improve traffic safety in order to make cities and human settlements inclusive, safe, resilient and sustainable. From the viewpoint of improving traffic safety, driving support techniques and automatic driving techniques for moving objects (for example, vehicles) have been developed. For example, JP-A-2015-074259 discloses a technique in which, when a user selects an automatic steering start button on a left side, parking by automatic steering is started while a target parking position corresponding to a first candidate position image on the left side is set, whereas, when the user selects an automatic steering start button on a right side, parking by automatic steering is started while a target parking position corresponding to a first candidate position image on the right side is set.

When moving a moving object that can move according to a plurality of types of movement patterns by automatic steering to a target position, a user may want to determine the movement pattern of the moving object when moving to the target position after determining the target position, or may want to determine the target position after determining the movement pattern. However, in the related art, the user cannot change a determination order of the target position and the movement pattern, and thus there is room for improvement from the viewpoint of user convenience.

SUMMARY

The present disclosure provides a control device and a moving object including the control device that allow a user to change a determination order of a target position and a movement pattern of the moving object when moving to the target position and thus improve user convenience.

According to a first aspect of the present disclosure, there is provided a control device configured to control a moving object that is moved by automatic steering to a target position specified by a user, the moving object being configured to be movable according to a plurality of types of movement patterns, and moving according to a movement pattern selected by the user from among the plurality of types of movement patterns when moving to the target position, where: the control device has a first mode and a second mode, and is configured to be switchable between the first mode and the second mode according to an operation of the user; in the first mode, the control device receives selection of the movement pattern after receiving specification of the target position; and in the second mode, the control device receives the specification of the target position after receiving the selection of the movement pattern.

According to a second aspect of the present disclosure, there is provided a moving object including: the control device according to the first aspect, in which the moving object is configured to be moved by automatic steering to the target position specified by the user, and the moving object is configured to be movable according to the plurality of types of movement patterns, and moves according to the movement pattern selected by the user from among the plurality of types of movement patterns when moving to the target position.

According to the present disclosure, it is possible to provide the control device and the moving object including the control device that allow a user to change a determination order of a target position and a movement pattern of the moving object when moving to the target position and thus improve user convenience.

DESCRIPTION OF EMBODIMENTS

Figure 1:
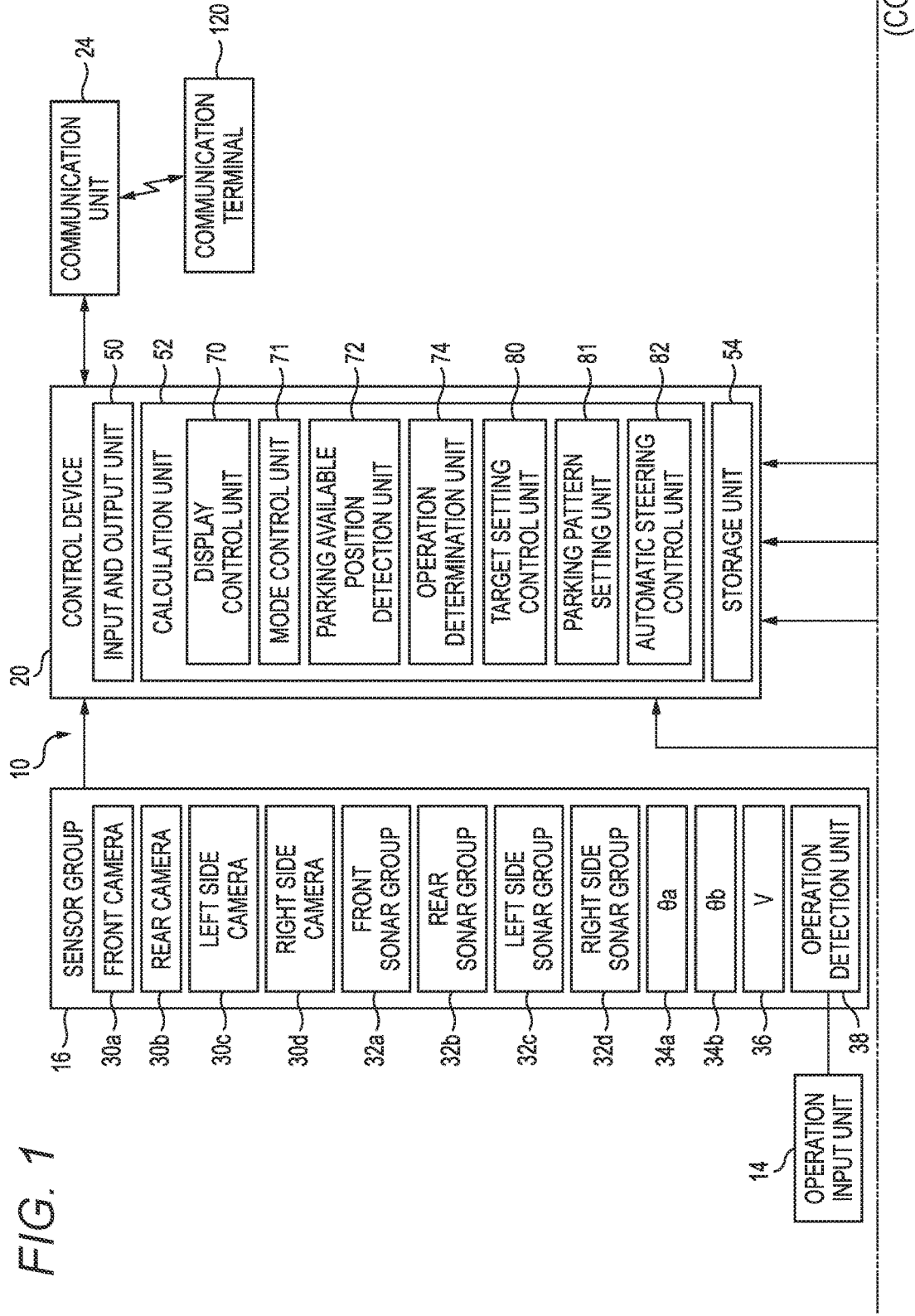
FIG. 1 is a block diagram showing a schematic configuration of a vehicle including a control device according to an embodiment.

Hereinafter, an embodiment of a control device according to the present disclosure and a moving object including the control device will be described in detail with reference to the drawings. Hereinafter, an embodiment in which the moving object according to the present disclosure is a vehicle will be described. In the present specification and the like, in order to simplify and clarify the description, directions such as front, rear, left, right, up, and down are described according to directions viewed from a driver of the vehicle. In addition, in the following description, the same or similar elements are denoted by the same or similar reference numerals, and the description thereof may be omitted or simplified as appropriate.

[Vehicle]

A vehicle 10 according to the present embodiment shown in FIG. 1 is an automobile including a driving source, and wheels (all not shown) including driving wheels driven by power of the driving source and steerable wheels that are steerable. For example, the vehicle 10 is a four-wheeled automobile including a pair of left and right front wheels and a pair of left and right rear wheels. The driving source of the vehicle 10 may be an electric motor, an internal combustion engine such as a gasoline engine or a diesel engine, or a combination of an electric motor and an internal combustion engine. In addition, the driving source of the vehicle 10 may drive the pair of left and right front wheels, the pair of left and right rear wheels, or four wheels, that is, the pair of left and right front wheels and the pair of left and right rear wheels. One of the front wheels and the rear wheels may be steerable wheels that are steerable, or the front wheels and the rear wheels may both be steerable wheels that are steerable.

The vehicle 10 is configured to be movable by automatic steering to a target position specified by a user. As the target position, a position where the vehicle 10 is parked (hereinafter, also simply referred to as a "parking position") may be set. That is, the vehicle 10 is configured to be capable of being parked by automatic steering at a parking position specified by the user. In addition, at this time, the vehicle 10 moves to the parking position according to a parking pattern corresponding to the parking position (that is, the target position) specified by the user from among a plurality of types of parking patterns. Here, the parking pattern defines a movement mode when the vehicle 10 moves to the parking position. Examples of the plurality of types of parking patterns include a forward parking pattern in which the vehicle 10 is parked forward with respect to the parking position that is the target position, a backward parking pattern in which the vehicle 10 is parked backward with respect to the parking position that is the target position, and a parallel parking pattern in which the vehicle 10 is parked in parallel with respect to the parking position that is the target position. The forward parking pattern is an example of a first movement pattern, the backward parking pattern is an example of a second movement pattern, and the parallel parking pattern is an example of a third movement pattern.

As shown in FIG. 1, the vehicle 10 includes a sensor group 16, a navigation device 18, the control device 20, an electric power steering system (EPS system) 22, a communication unit 24, a driving force control system 26, and a braking force control system 28.

The sensor group 16 acquires various detection values related to the vehicle 10 or surroundings of the vehicle 10. The detection values acquired by the sensor group 16 are provided, for example, for parking assistance of the vehicle 10. Here, the parking assistance means to park the vehicle by automatic steering at a parking position specified by the user. As will be described in detail later, in the vehicle 10, two modes related to parking assistance are prepared, that is, a first mode in which selection of a parking pattern is received after specification of a parking position is received, and a second mode in which the specification of the parking position is received after the selection of the parking pattern is received, and the first mode and the second mode can be switched by the user by performing a predetermined operation.

The sensor group 16 includes a front camera 30*a*, a rear camera 30*b*, a left side camera 30*c*, a right side camera 30*d*, a front sonar group 32*a*, a rear sonar group 32*b*, a left side sonar group 32*c*, and a right side sonar group 32*d*. The cameras and the sonar groups can function as an external sensor that acquires information on the surroundings of the vehicle 10.

The front camera 30*a*, the rear camera 30*b*, the left side camera 30*c*, and the right side camera 30*d* output, to the control device 20, image data of surrounding images obtained by capturing images of the surroundings of the vehicle 10. The surrounding images captured by the front camera 30*a*, the rear camera 30*b*, the left side camera 30*c*, and the right side camera 30*d* are referred to as a front image, a rear image, a left side image, and a right side image, respectively. An image formed by the left side image and the right side image is also referred to as a side image.

The front sonar group 32*a*, the rear sonar group 32*b*, the left side sonar group 32*c*, and the right side sonar group 32*d* emit sound waves to the surroundings of the vehicle 10 and receive reflected sounds from other objects. The front sonar group 32*a* includes, for example, four sonars. The sonars constituting the front sonar group 32*a* are respectively provided at an obliquely left front side, a front left side, a front right side, and an obliquely right front side of the vehicle 10. The rear sonar group 32*b* includes, for example, four sonars. The sonars constituting the rear sonar group 32*b* are respectively provided at an obliquely left rear side, a rear left side, a rear right side, and an obliquely right rear side of the vehicle 10. The left side sonar group 32*c* includes, for example, two sonars. The sonars constituting the left side sonar group 32*c* are provided in the front of a left side portion of the vehicle 10 and in the rear of the left side portion, respectively. The right side sonar group 32*d* includes, for example, two sonars. The sonars constituting the right side sonar group 32*d* are provided in the front of a right side portion of the vehicle 10 and in the rear of the right side portion, respectively.

The sensor group 16 further includes wheel sensors 34*a* and 34*b*, a vehicle speed sensor 36, and an operation detection unit 38. Each of the wheel sensors 34*a* and 34*b* detects a rotation angle of a wheel (not shown). The wheel sensors 34*a* and 34*b* may be implemented by angle sensors or displacement sensors. The wheel sensors 34*a* and 34*b* output detection pulses each time the wheel rotates by a predetermined angle. The detection pulses output from the wheel sensors 34*a* and 34*b* can be used to calculate the rotation angle of the wheel and a rotation speed of the wheel. A movement distance of the vehicle 10 can be calculated based on the rotation angle of the wheel. The wheel sensor 34*a* detects, for example, a rotation angle θa of the left rear wheel. The wheel sensor 34*b* detects, for example, a rotation angle θb of the right rear wheel.

The vehicle speed sensor 36 detects a traveling speed of a vehicle body (not shown) of the vehicle 10, that is, a vehicle speed V, and outputs the detected vehicle speed V to the control device 20. The vehicle speed sensor 36 detects the vehicle speed V based on, for example, rotation of a countershaft of a transmission.

The operation detection unit 38 detects contents of an operation performed by the user by using an operation input unit 14, and outputs the detected contents of the operation to the control device 20. The operation input unit 14 may include, for example, an operation button that receives an operation of executing parking assistance. The operation input unit 14 may be shared with a touch panel 42 to be described later. In addition, the operation input unit 14 may include a shift lever (a select lever, a selector) that is used when switching between forward movement and backward movement of the vehicle 10.

The navigation device 18 detects a current position of the vehicle 10 by using, for example, a global positioning system (GPS), and guides the user along a route toward a destination. The navigation device 18 includes a storage device (not shown) that includes a map information database.

The navigation device 18 includes the touch panel 42 and a speaker 44. The touch panel 42 functions as an input device that receives input of various types of information input to the control device 20 and a display device that is controlled by the control device 20. That is, the user can input various commands to the control device 20 via the touch panel 42. In addition, various screens are displayed on the touch panel 42. As an example, a screen related to parking assistance (hereinafter, also referred to as a "parking assistance screen PS") is displayed on the touch panel 42. The parking assistance screen PS will be described later.

The speaker 44 outputs various types of guidance information to the user by voice. As an example, at the time of parking assistance, voice guidance may be performed via the speaker 44. Specifically, when movement by automatic steering to the target parking position is started, the start of the movement of the vehicle 10 may be guided by voice via the speaker 44. That is, the speaker 44 may function as a notification unit that notifies an occupant of the vehicle 10 that the movement of the vehicle 10 is started by automatic steering.

The control device 20 integrally controls the entire vehicle 10. The control device 20 includes, for example, an input and output unit 50, a calculation unit 52, and a storage unit 54. The input and output unit 50 is an interface that inputs and outputs data between the inside and the outside of the control device 20 under control of the calculation unit 52. The storage unit 54 is implemented by, for example, a non-volatile storage medium such as a flash memory, and stores various types of information (for example, data and programs) for controlling an operation of the vehicle 10.

The calculation unit 52 is implemented by, for example, a central processing unit (CPU) or the like, and controls each unit by executing a program stored in the storage unit 54. Accordingly, the parking assistance described above is implemented. For example, when an operation of executing the parking assistance is received via the operation input unit 14 or the like, the calculation unit 52 executes the parking assistance.

As functional units related to the parking assistance, the calculation unit 52 includes, for example, a display control unit 70, a mode control unit 71, a parking available position detection unit 72, an operation determination unit 74, a target setting control unit 80, a parking pattern setting unit 81, and an automatic steering control unit 82. The display control unit 70 controls display contents of the touch panel 42. For example, the display control unit 70 displays the parking assistance screen PS on the touch panel 42 along with execution of the parking assistance.

The mode control unit 71 has a first mode and a second mode as modes related to the parking assistance, and switches between the first mode and the second mode according to an operation from the user. Here, the first mode is a mode in which, after specification of a parking position that serves as a target position (hereinafter, also referred to as a "target parking position") is received, selection of a parking pattern when parking at the target parking position is received. That is, according to the first mode, the user can determine the target parking position in preference to the parking pattern. On the other hand, the second mode is a mode in which, after the selection of the parking pattern is received, the specification of the target parking position where parking is performed according to the parking pattern is received. That is, according to the second mode, the user can determine the parking pattern in preference to the target parking position.

For example, when there is an operation of executing the parking assistance, the mode control unit 71 first sets the mode to the first mode. In the first mode, when the user performs an operation of switching to the second mode (for example, an operation performed on a second mode button Bn1 to be described later), the mode control unit 71 switches from the first mode to the second mode. Further, the mode control unit 71 may switch from the second mode to the first mode when an operation for switching to the first mode is performed by the user in the second mode.

Figure 2:
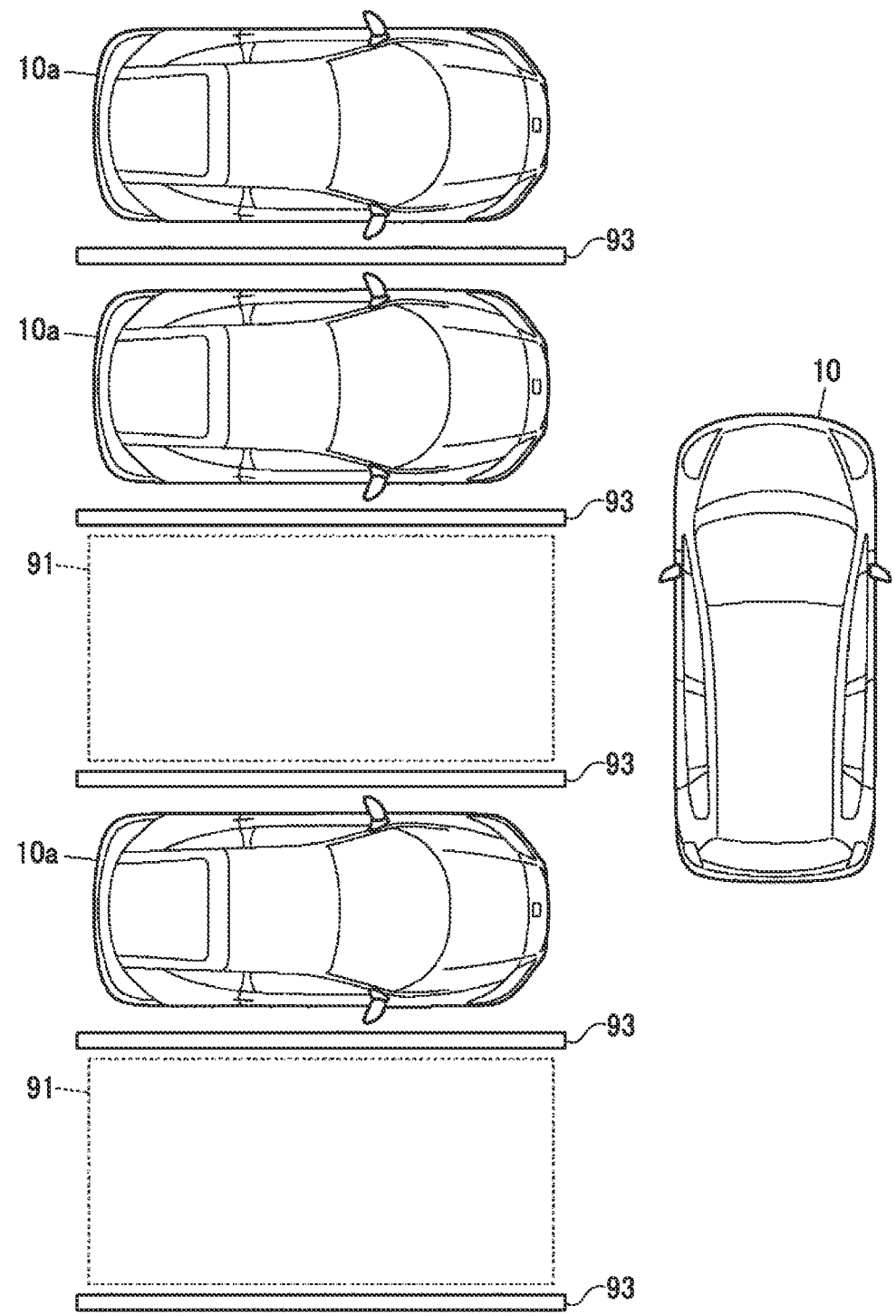
FIG. 2 shows an example of a parking available position detected in a first mode.

When the mode is set to the first mode by the mode control unit 71, the parking available position detection unit 72 detects a parking available position, which is a position where the vehicle 10 can be parked, based on a detection result of the sensor group 16. For example, as shown in FIG. 2, it is assumed that there are five parking spaces partitioned by white lines 93, other vehicles 10a are parked in three parking spaces among the five parking spaces, and no other vehicle 10a is parked in the remaining two parking spaces 91 indicated by reference numerals 91 in FIG. 2. In such a case, the parking available position detection unit 72 detects the parking space 91 where no other vehicle 10a is parked as the parking available position.

In addition, the parking available position detection unit 72 may also detect a place other than the parking space partitioned by the white line 93 or the like as the parking available position. As an example, the parking available position detection unit 72 may detect any place that is set as the parking available position by the user as the parking available position. As another example, the parking available position detection unit 72 may detect any place where the vehicle 10 can be physically parked as the parking available position. The parking available position is an example of a candidate position.

In this way, when the mode is set to the first mode by the mode control unit 71, the parking available position detection unit 72 detects the parking available position. As will be described in detail later, in the first mode, one of the parking available positions detected by the parking available position detection unit 72 may be set as the target parking position.

On the other hand, when the mode is set to the second mode by the mode control unit 71, the parking available position detection unit 72 does not detect the parking available position. As will be described in detail later, in the second mode, the user can set any place as the target parking position. In other words, the second mode is a mode in which the user can manually set the target parking position.

When the parking available position is detected by the parking available position detection unit 72 (that is, when in the first mode), the display control unit 70 displays, on the touch panel 42, a first candidate position image (hereinafter, referred to as a "first candidate position image GF1") indicating the detected parking available position. The first candidate position image GF1 is, for example, a frame image representing an outline of the detected parking available position (see, for example, FIGS. 3 to 5). By displaying the first candidate position image GF1 on the touch panel 42, it is possible to guide the user to the parking available position detected by the parking available position detection unit 72.

As will be described in detail later, the display control unit 70 displays, on the touch panel 42, the parking assistance screen PS including a bird eye view image (hereinafter, also referred to as a "bird eye view image PS1") in which the vehicle 10 and the surroundings of the vehicle 10 are viewed from directly above. Then, the display control unit 70 displays the first candidate position image GF1 on the bird eye view image PS1. Accordingly, the user can be guided to the parking available position detected by the parking available position detection unit 72 in an intuitive and easy-to-understand manner. The bird eye view image PS1 can be generated from, for example, surrounding images obtained by the front camera 30a, the rear camera 30b, the left side camera 30c, and the right side camera 30d.

In addition, a plurality of parking available positions may be detected by the parking available position detection unit 72. In such a case, the display control unit 70 displays, on the touch panel 42, the first candidate position image GF1 corresponding to each of the plurality of detected parking available positions. That is, in such a case, the display control unit 70 displays a plurality of first candidate position images GF1 on the touch panel 42.

When the plurality of first candidate position images GF1 are displayed on the touch panel 42, the operation determination unit 74 receives an operation of selecting a first candidate position image GF1 indicating a parking available position to be set as the target parking position from among the plurality of first candidate position images GF1. A method of receiving the operation will be described later, and thus detailed description thereof will be omitted here.

Figure 13:
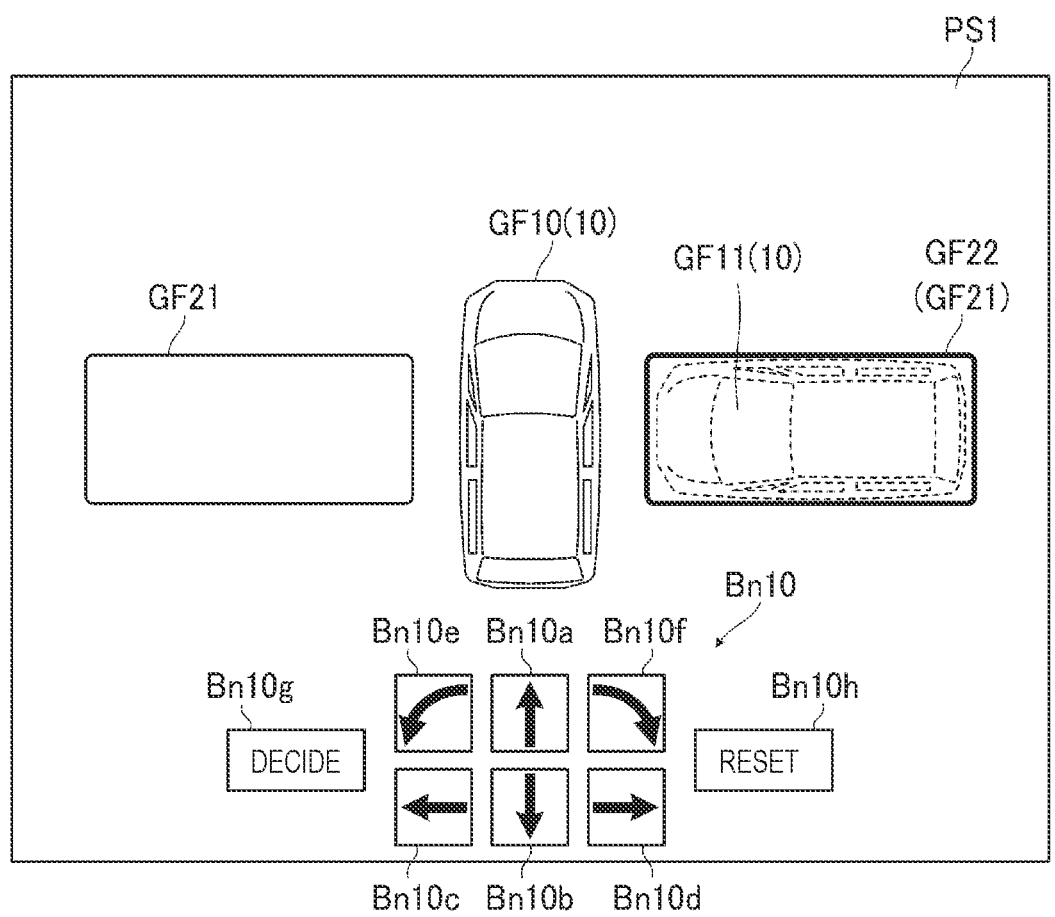
FIG. 13 shows an example of a bird eye view image in the second mode (part 1).
Figure 14:
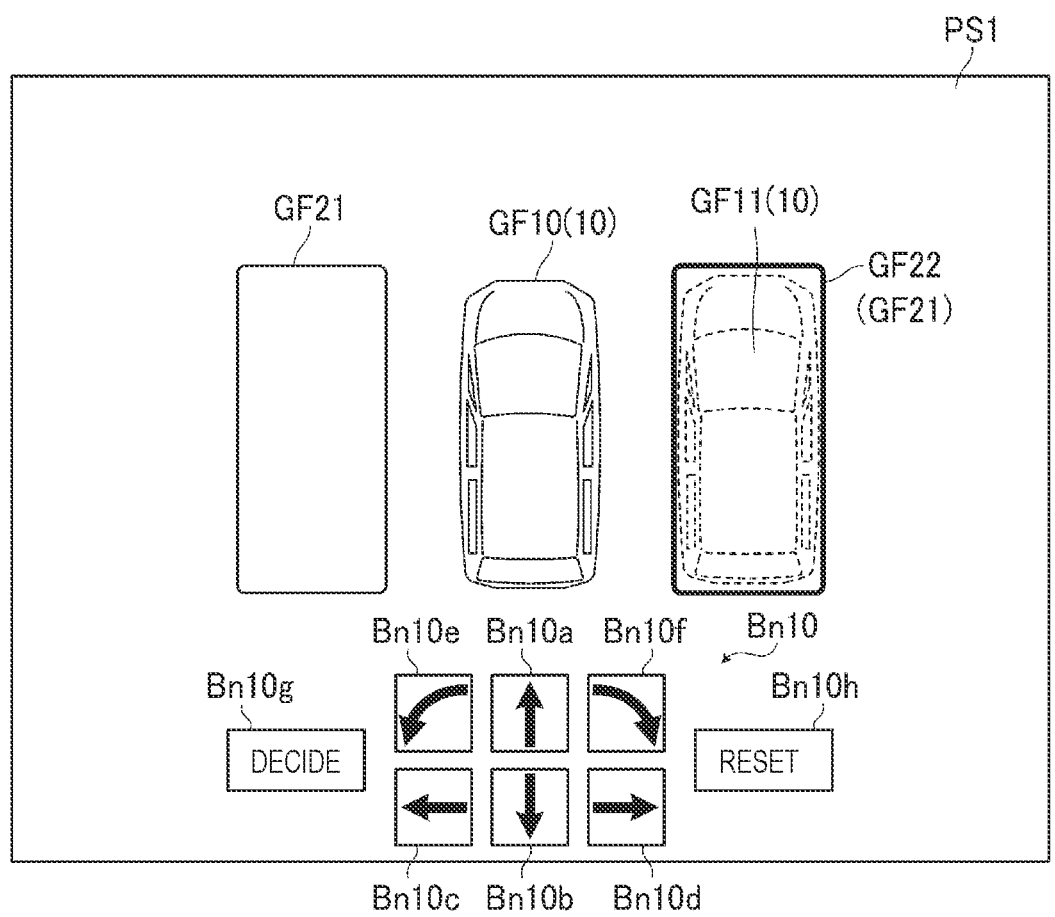
FIG. 14 shows the example of the bird eye view image in the second mode (part 2).

On the other hand, in the second mode, the display control unit 70 displays, on the touch panel 42, a second candidate position image GF21 for the user to manually set the target parking position. The second candidate position image GF21 is, for example, a frame image representing an outline of a place (region) set as the target parking position (see, for example. FIGS. 13 and 14). Further, when the second candidate position image GF21 is displayed, the display control unit 70 displays, on the touch panel 42, an operation button group (hereinafter, also referred to as an "operation button group Bn10") that receives an operation of adjusting a position or angle of the second candidate position image GF21 or setting a place indicated by the second candidate position image GF21 as the target parking position.

When the second candidate position image GF21 and the operation button group Bn10 are displayed on the touch panel 42, if the operation of adjusting the position or angle of the second candidate position image GF21 is performed by using the operation button group Bn10, the operation determination unit 74 receives the operation. When the operation determination unit 74 receives the operation for adjusting the position or angle of the second candidate position image GF21, the display control unit 70 adjusts the position or angle of the second candidate position image GF21 on a display screen of the touch panel 42 according to the operation received by the operation determination unit 74. When the second candidate position image GF21 and the operation button group Bn10 are displayed on the touch panel 42, if the operation of setting the place indicated by the second candidate position image GF21 as the target parking position is performed by using the operation button group Bn10, the operation determination unit 74 receives the operation.

The target setting control unit 80 sets the target parking position based on an operation of the user. For example, in the first mode, in response to the operation determination unit 74 receiving the operation of selecting the first candidate position image GF1 indicating the parking available position to be set as the target parking position, the target setting control unit 80 sets the parking available position indicated by the first candidate position image GF1 selected by the operation as the target parking position. On the other hand, in the second mode, in response to the operation determination unit 74 receiving the operation of setting the place indicated by the second candidate position image GF21 as the target parking position, the target setting control unit 80 sets the place indicated by the second candidate position image GF21 as the target parking position when the operation is received.

The parking pattern setting unit 81 sets a parking pattern of the vehicle 10 when moving to the target parking position. For example, in the first mode, the parking pattern setting unit 81 sets, as the parking pattern of the vehicle 10 when moving to the target parking position, a parking pattern selected by the user from among parking patterns that can be selected according to the parking available position selected as the target parking position. Here, the parking patterns that can be selected according to the parking available position are set in advance in the control device 20, for example. This setting may be performed by, for example, a manufacturer of the vehicle 10 or may be performed by the user. In addition, the control device 20 may appropriately derive and set the parking patterns that can be selected according to the parking available position based on an image analysis result of a landscape around the parking available position or the like.

On the other hand, in the second mode, the parking pattern setting unit 81 sets, as the parking pattern of the vehicle 10 when moving to the target parking position, a pattern selected by the user from among the forward parking pattern in which the vehicle 10 is parked forward with respect to the target parking position, the backward parking pattern in which the vehicle 10 is parked backward with respect to the target parking position, and the parallel parking pattern in which the vehicle 10 is parked in parallel with respect to the target parking position. That is, in the second mode, the user can select a desired parking pattern from all the selectable parking patterns of the vehicle 10.

The automatic steering control unit 82 automatically operates a steering wheel 110 such that the vehicle 10 reaches the target parking position set by the target setting control unit 80 according to the parking pattern set by the parking pattern setting unit 81. The automatic operation of the steering wheel 110 is performed by the EPS system 22 controlling an EPS motor 104. In addition, the automatic steering control unit 82 may execute driving force control of the vehicle 10 via the driving force control system 26 to be described later or may execute braking force control of the vehicle 10 via the braking force control system 28 to be described later such that the vehicle 10 reaches the target parking position set by the target setting control unit 80 according to the parking pattern set by the parking pattern setting unit 81.

The EPS system 22 includes a steering angle sensor 100, a torque sensor 102, the EPS motor 104, a resolver 106, and an EPS electronic control unit (EPSECU) 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 connected to the steering wheel 110, thereby enabling assistance of an operation performed by the driver on the steering wheel 110 and enabling automatic steering at the time of parking assistance. The resolver 106 detects a rotation angle θm of the EPS motor 104. The EPSECU 108 controls the entire EPS system 22. The EPSECU 108 includes an input and output unit, a calculation unit, and a storage unit (all not shown).

The communication unit 24 enables wireless communication with another communication device 120. The other communication device 120 is a base station, a communication device of another vehicle, an information terminal such as a smartphone carried by the user of the vehicle 10, or the like. The control device 20 can communicate with the communication device 120 via the communication unit 24.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed on an accelerator pedal (not shown) by the user or an instruction from the control device 20.

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed on a brake pedal (not shown) by the user.

Specific Example in First Mode

Figure 3:
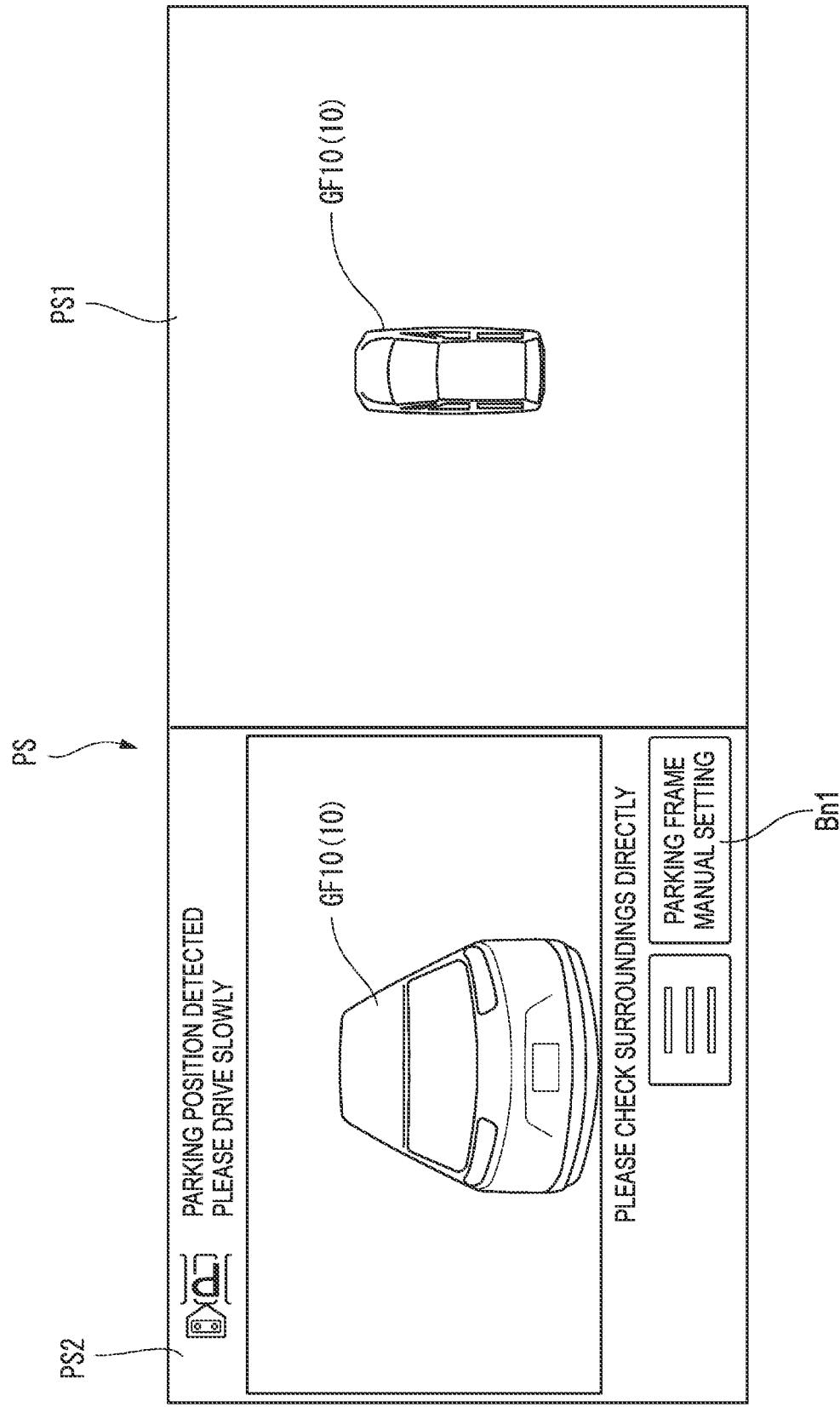
FIG. 3 is a flowchart showing an example of a parking assistance screen displayed when no parking available position is detected in the first mode.
Figure 4:
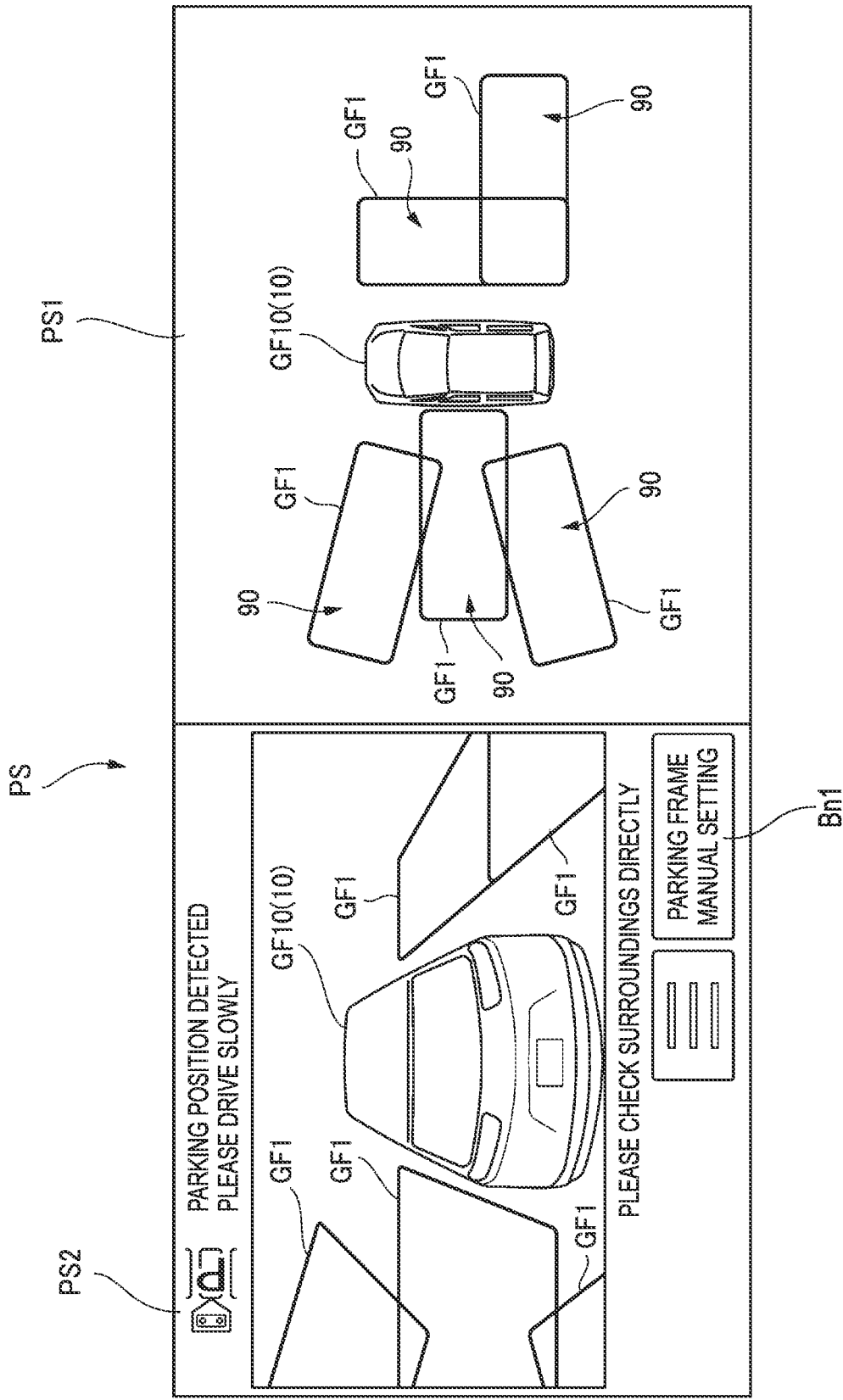
FIG. 4 shows an example of a parking assistance screen displayed when a plurality of parking available positions are detected and none of first candidate position images is selected in the first mode.

Next, a specific example in the first mode will be described with reference to FIGS. 3 to 5. FIG. 3 shows an example of the parking assistance screen PS displayed when no parking available position is detected by the parking available position detection unit 72 (for example, immediately after the execution of the parking assistance is started) in the first mode. In addition, FIG. 4 shows an example of the parking assistance screen PS displayed when a plurality of parking available positions are detected by the parking available position detection unit 72 and none of the first candidate position images GF1 is selected in the first mode. Then, FIG. 5 shows an example of the parking assistance screen PS displayed when a plurality of parking available positions are detected by the parking available position detection unit 72 and one of the first candidate position images GF1 is selected in the first mode.

Figure 5:
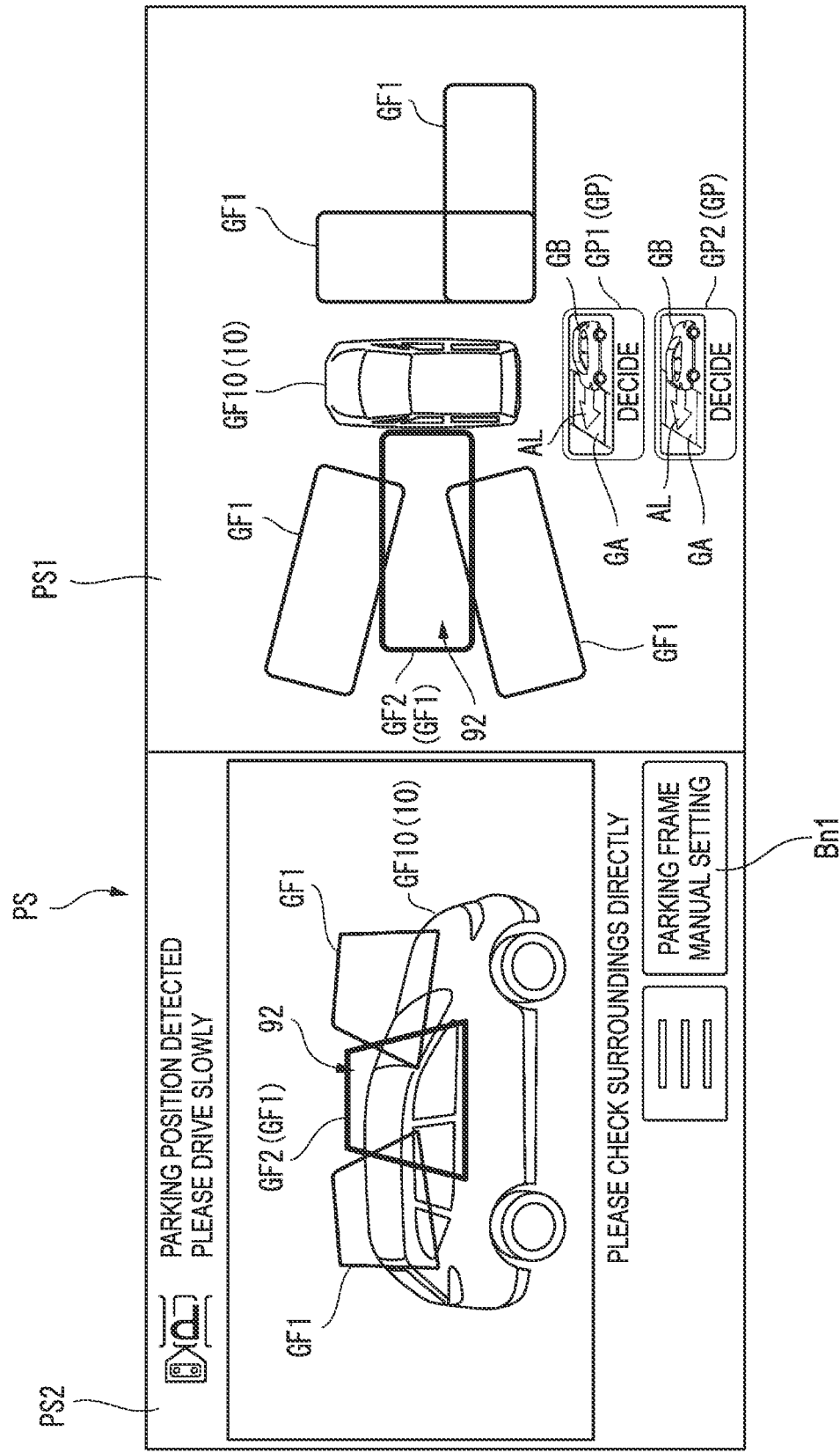
FIG. 5 shows an example of a parking assistance screen displayed when a plurality of parking available positions are detected and one of first candidate position images is selected in the first mode.

As shown in FIGS. 3 to 5, the parking assistance screen PS includes the bird eye view image PS1 and a direction image PS2. As an example, the bird eye view image PS1 is displayed in a region on one of left and right sides on the parking assistance screen PS (a region on a right half in the shown example), and the direction image PS2 is displayed in a region on the other of the left and right sides on the parking assistance screen PS (a region on a left half in the shown example).

As described above, the bird eye view image PS1 is an image in which the vehicle 10 is viewed from directly above. The direction image PS2 is a three-dimensional image virtually showing a space including the vehicle 10 and the surroundings thereof. A viewpoint position of the direction image PS2 is set such that the direction image PS2 is an image including a landscape in a predetermined direction (for example, forward or lateral direction) of the vehicle 10. The direction image PS2 can be generated, for example, by performing image processing of three-dimensionally reconstructing a composite image obtained by combining surrounding images obtained by the front camera 30*a*, the rear camera 30*b*, the left side camera 30*c*, and the right side camera 30*d*.

In addition, as shown in FIGS. 3 to 5, the parking assistance screen PS displayed in the first mode is provided with the second mode button Bn1 configured to receive an operation for switching to the second mode. In the present embodiment, the second mode button Bn1 is displayed below the direction image PS2 such that the second mode button Bn1 does not block the bird eye view image PS1 and the direction image PS2. However, a position where the second mode button Bn1 is displayed is not limited thereto, and may be any position as desired.

As shown in FIG. 3, when no parking available position is detected, no first candidate position image GF1 is displayed on the parking assistance screen PS. On the other hand, as shown in FIGS. 4 and 5, when the parking available position is detected, the first candidate position image GF1 is displayed on the parking assistance screen PS. For example, it is assumed that the parking available position detection unit 72 detects a plurality of parking available positions 90 around the vehicle 10. In this case, as shown in FIGS. 4 and 5, the bird eye view image PS1 including an own vehicle image GF10 indicating the vehicle 10 and the plurality of first candidate position images GF1 indicating the detected parking available positions 90 is displayed.

Specifically, in the example shown in FIGS. 4 and 5, since three parking available positions 90 are detected on the left side of the vehicle 10, three first candidate position images GF1 corresponding to these parking available positions 90 are displayed on the left side of the own vehicle image GF10 in the bird eye view image PS1. In addition, in the example shown in FIGS. 4 and 5, since two parking available positions 90 are detected on the right side of the vehicle 10, two first candidate position images GF1 corresponding to these parking available positions 90 are displayed on the right side of the own vehicle image GF10 in the bird eye view image PS1.

As shown in FIGS. 4 and 5, when the detected parking available position 90 is present in the direction represented by the direction image PS2, the first candidate position image GF1 indicating the parking available position 90 is also displayed in the direction image PS2. Accordingly, display contents of the bird eye view image PS1 and the direction image PS2 can be consistent.

It is assumed that, when the plurality of first candidate position images GF1 are displayed in this manner, the user performs an operation of selecting one first candidate position image GF1 among the plurality of first candidate position images GF1. In this case, as shown in FIG. 5, one of the plurality of first candidate position images GF1 is highlighted as a selected first candidate position image GF2 so as to be distinguishable from the other first candidate position images GF1. The selected first candidate position image GF2 indicates the parking available position 90 set as the target parking position 92. Examples of modes of the highlighting include a mode in which a thickness of an outline of the selected first candidate position image GF2 is made thicker than that of the other first candidate position images GF1, and a mode in which a display color of the outline of the selected first candidate position image GF2 is made different from a display color of the other first candidate position images GF1.

In addition, when the user performs the operation of selecting one of the first candidate position images GF1, the viewpoint position of the direction image PS2 is set such that the direction represented by the direction image PS2 is a direction in which the parking available position 90 indicated by the selected first candidate position image GF2 is present, as shown in FIG. 5. For example, as shown in FIG. 5, when the parking available position 90 indicated by the selected first candidate position image GF2 is present on the left side of the vehicle 10, the viewpoint position of the direction image PS2 is set such that the direction image PS2 is an image including a landscape on the left side of the vehicle 10.

In addition, when the user performs the operation of selecting one of the first candidate position images GF1, as shown in FIG. 5, a parking pattern image GP is displayed below a position where the own vehicle image GF10 in the bird eye view image PS1 is displayed. The parking pattern image GP includes a first image GA representing the parking available position 90 indicated by the selected first candidate position image GF2 (that is, the parking available position 90 that is the target parking position 92), a second image GB representing the vehicle 10, and a third image AL representing a route of the vehicle 10. By a combination of the first image GA, the second image GB, and the third image AL, the parking pattern image GP indicates a parking pattern corresponding to the parking available position 90 indicated by the selected first candidate position image GF2. As will be described in detail later, a parking pattern image GP1 indicating the forward parking pattern, a parking pattern image GP2 indicating the backward parking pattern, and a parking pattern image GP3 indicating the parallel parking pattern may be displayed as the parking pattern image GP.

By displaying such a parking pattern image GP below the position where the vehicle 10 (own vehicle image GF10) is displayed in the bird eye view image PS1 displayed on the side opposite to the region in which the direction image PS2 is displayed, it is possible to display the parking pattern image GP in such a manner that a limited display region of the touch panel 42 is effectively utilized.

The user can change the first candidate position image GF1 displayed as the selected first candidate position image GF2 from one first candidate position image GF1 to another first candidate position image GF1 by performing a predetermined operation when the selected first candidate position image GF2 is displayed, details thereof will be described later. In this way, by changing the first candidate position image GF1 displayed as the selected first candidate position image GF2, the user can change the parking available position 90 set as the target parking position 92.

[First Mode Process]

Next, an example of a process executed by the control device 20 will be described. First, an example of a first mode process executed by the control device 20 when the mode is set to the first mode along with the execution of the parking assistance will be described with reference to FIGS. 3 to 5 and 7 to 10 according to a flowchart shown in FIG. 6.

Figure 6:
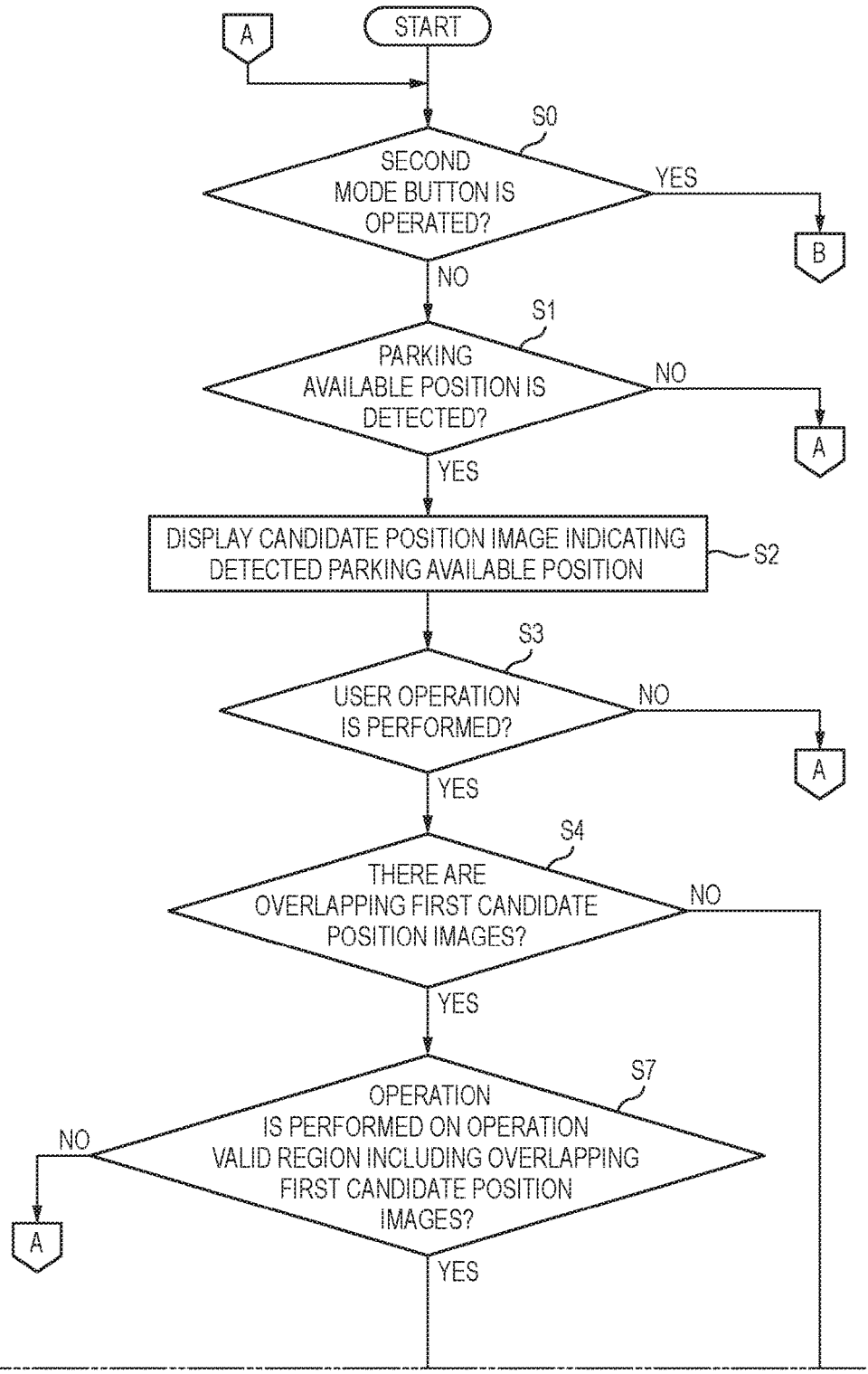
FIG. 6 is a flowchart showing an example of a first mode process.

As shown in FIG. 6, in the first mode process, the control device 20 first determines whether the user operates the second mode button Bn1 (step S0). When it is determined that there is no operation performed on the second mode button Bn1 (step S0: No), the control device 20 determines whether the parking available position 90 is detected (step S1). When no parking available position 90 is detected (step S1: No), the control device 20 repeats the process of step S1. At this time, since no parking available position 90 is detected, the control device 20 displays, on the touch panel 42, the parking assistance screen PS on which no first candidate position image GF1 is displayed, as shown in FIG. 3.

When it is determined that the parking available position 90 is detected (step S1: Yes), the control device 20 displays, on the touch panel 42, the first candidate position image GF1 indicating the detected parking available position 90 (step S2). Accordingly, the parking assistance screen PS on which the first candidate position images GF1 are displayed is displayed on the touch panel 42, as shown in FIG. 4.

Next, the control device 20 determines whether the user performs an operation on the touch panel 42 (step S3). In step S3, the control device 20 determines whether there is any operation of selecting one of the first candidate position images GF1, in other words, any operation of selecting the first candidate position image GF1 indicating the parking available position 90 to be set as the target parking position 92. An example of this operation is an operation (touching) performed on any position as desired in the bird eye view image PS1 on the touch panel 42.

In step S3, when it is determined that there is no operation performed by the user (step S3: No), the control device 20 returns to the process of step S1. On the other hand, when it is determined that there is an operation performed by the user (step S3: Yes), the control device 20 determines whether there are first candidate position images GF1 overlapping each other among the first candidate position images GF1 displayed on the touch panel 42 (step S4.

When it is determined that there is no overlapping first candidate position image GF1 (step S4: No), the control device 20 determines whether the operation of the user performed in step S3 is an operation of selecting one of displayed first candidate position images GF1 (step S5). For example, in this case, when the operation of the user is an operation (touching) performed on one of the first candidate position images GF1 in the bird eye view image PS1, the control device 20 determines that there is an operation of selecting the first candidate position image GF1.

When the operation of the user is not the operation of selecting the first candidate position image GF1 (step S5: No), the control device 20 returns to the process of step S1. On the other hand, when the operation of the user is the operation of selecting the first candidate position image GF1 (step S5: Yes), the control device 20 sets the selected first candidate position image GF1 as the selected first candidate position image GF2 (step S6). Accordingly, the parking assistance screen PS on which the first candidate position image GF1 is displayed as the selected first candidate position image GF2 as shown in FIG. 5 is displayed on the touch panel 42.

On the other hand, when it is determined in step S4 that there are overlapping first candidate position images GF1 (step S4: Yes), the control device 20 determines whether the operation of the user performed in step S3 is an operation performed on a predetermined operation valid region (hereinafter, also referred to as an "operation valid region ED") including the overlapping first candidate position images GF1 (step S7).

As shown in FIGS. 7 to 10, the operation valid region ED herein is, for example, a rectangular region including a plurality of first candidate position images GF1. Accordingly, the operation valid region ED can be easily grasped intuitively by the user.

For example, an upper end, a lower end, a right end, and a left end of the operation valid region ED respectively coincide with upper ends, lower ends, right ends, and left ends of the plurality of first candidate position images GF1 in the operation valid region ED. Accordingly, the operation valid region ED can be more easily grasped intuitively by the user. Further, even when the user operates an end portion of one of the first candidate position images GF1 in the operation valid region ED, the operation can be reliably received as an operation performed on the operation valid region ED.

In addition, as shown in FIGS. 7 to 10, when a plurality of parking available positions 90 are detected on each of the left and right sides of the vehicle 10 and a plurality of first candidate position images GF1 are displayed on each of left and right sides of the own vehicle image GF10 in the bird eye view image PS1, the operation valid regions ED are provided on each of the left and right sides with the vehicle 10 (that is, the own vehicle image GF10) interposed therebetween in the bird eye view image PS1.

Specifically, in the example shown in FIGS. 7 to 10, three overlapping first candidate position images GF1 are displayed on the left side of the own vehicle image GF10 in the bird eye view image PS1. Therefore, an operation valid region ED1 including these three first candidate position images GF1 is provided on the left side of the own vehicle image GF10. In addition, in the example shown in FIGS. 7 to 10, two overlapping first candidate position images GF1 are displayed on the right side of the own vehicle image GF10 in the bird eye view image PS1. Therefore, an operation valid region ED2 including these two first candidate position images GF1 is provided on the right side of the own vehicle image GF10. In this way, the first candidate position images GF1 and the operation valid regions ED are separately provided on the left side and the right side of the vehicle 10 (that is, the own vehicle image GF10) in the bird eye view image PS1 according to a positional relationship between the vehicle 10 and the parking available positions 90, so that the user can more easily select the desired first candidate position image GF1 (to be described later).

In step S7, the control device 20 determines whether the operation of the user performed in step S3 is an operation performed on such an operation valid region ED (an operation to a position corresponding to the operation valid region ED). When it is determined that the operation is not performed on the operation valid region ED (step S7: No), the control device 20 returns to the process of step S1. On the other hand, when it is determined that the operation is performed on the operation valid region ED (step S7: Yes), the control device 20 executes a process of changing the selected first candidate position image GF2 (step S8).

Figure 7:
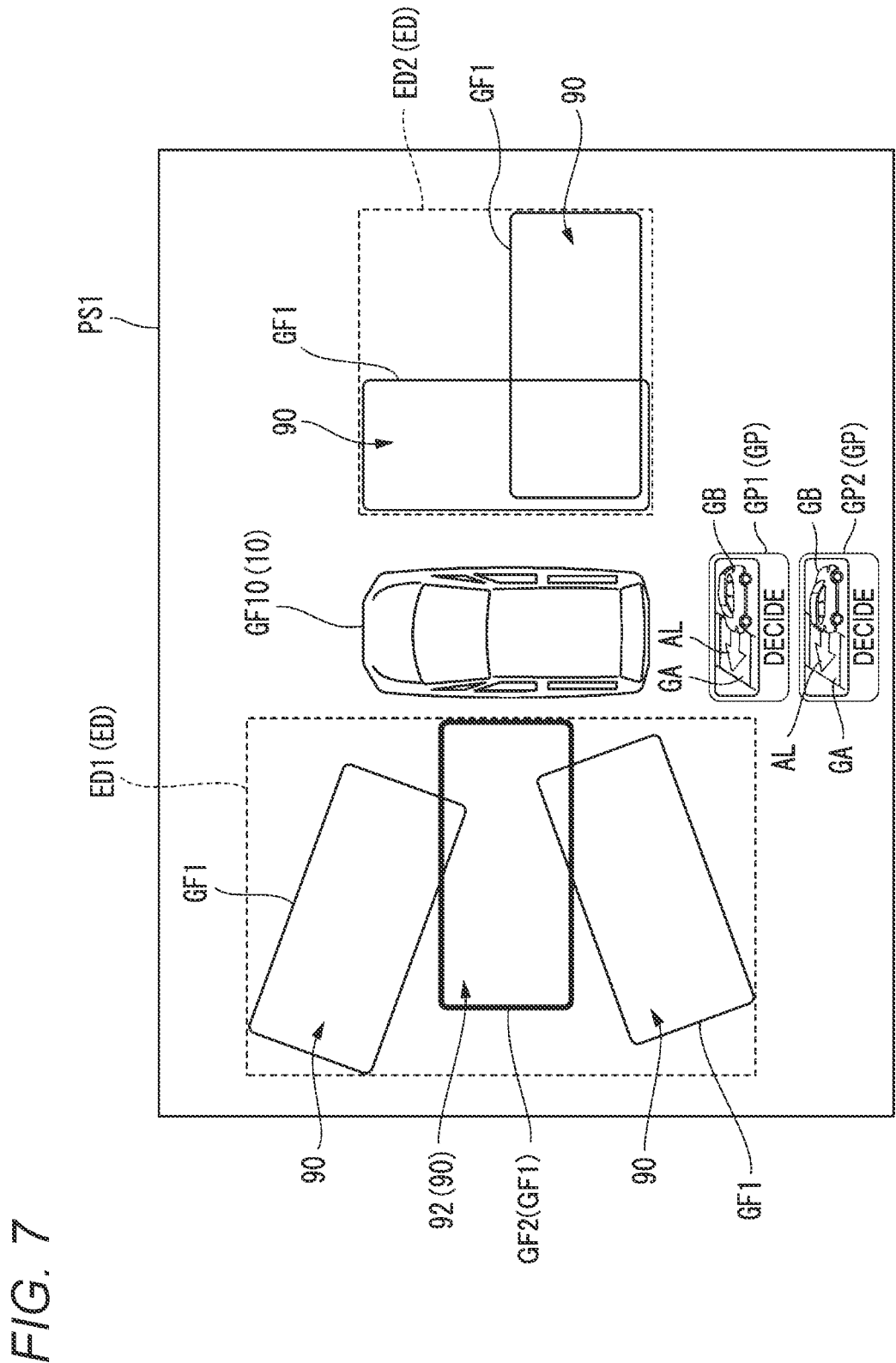
FIG. 7 shows an example of a bird eye view image and an operation valid region in the first mode (part 1).

For example, it is assumed that there is an operation performed on the operation valid region ED1 in the state shown in FIG. 7, that is, in a state in which the middle first candidate position image GF1 among the three first candidate position images GF1 in the operation valid region ED1 on the left side is the selected first candidate position image GF2. In this case, in the process of step S8, as shown in FIG. 8, the control device 20 changes the selected first candidate position image GF2 to one of the other two first candidate position images GF1 in the operation valid region ED1 (in the shown example, the first candidate position image GF1 closer to the rear of the vehicle 10).

Figure 8:
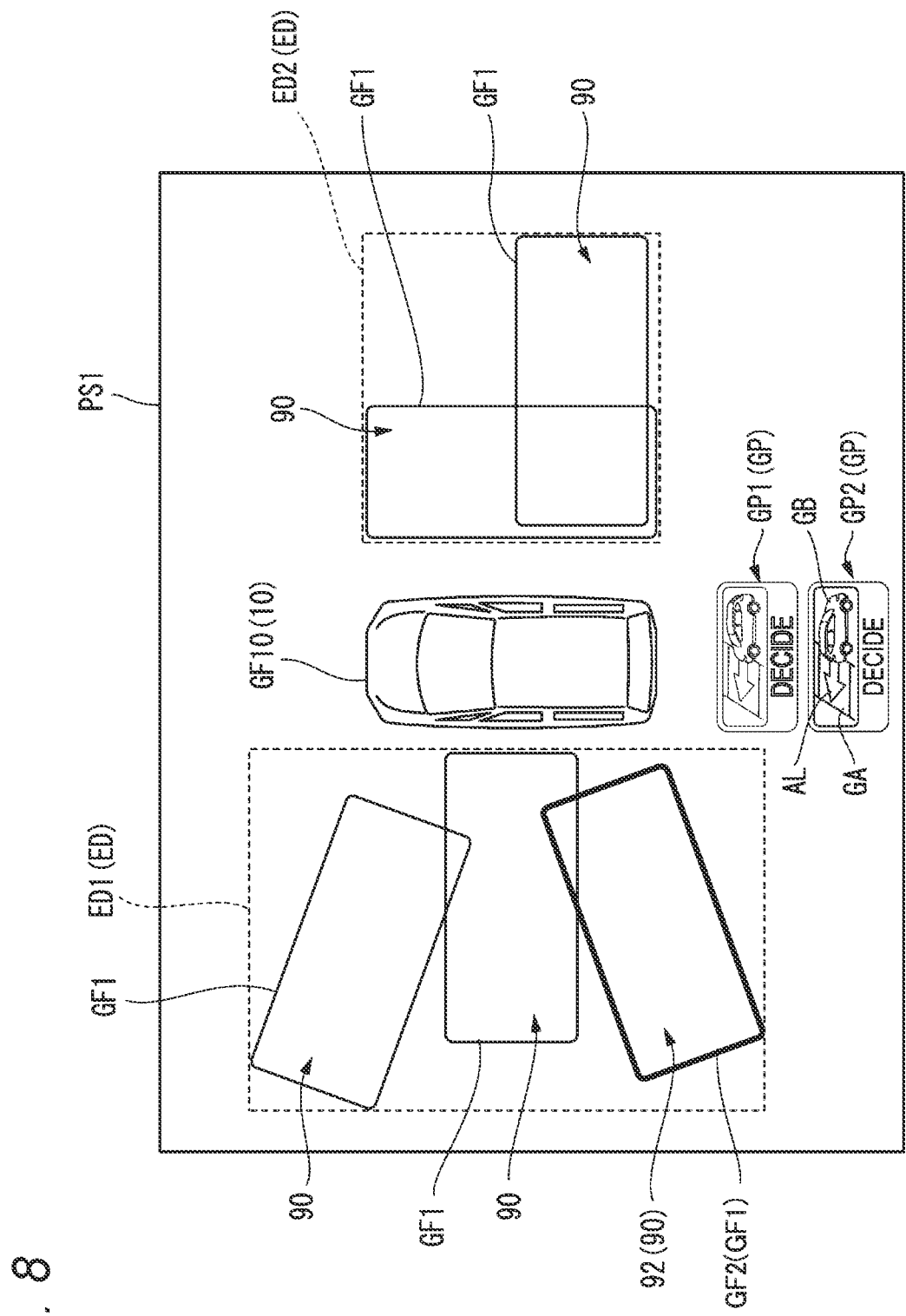
FIG. 8 shows the example of the bird eye view image and the operation valid region in the first mode (part 2).

In addition, in the state shown in FIG. 8, when the operation performed on the operation valid region ED1 is performed again, the control device 20 changes the selected first candidate position image GF2 to the other of the two first candidate position images GF1 (the first candidate position image GF1 closer to the front of the vehicle 10) in the process of step S8. That is, when an operation is performed on the operation valid region ED1 in a state in which one of the first candidate position images GF1 in the operation valid region ED1 is the selected first candidate position image GF2, the control device 20 sequentially switches the first candidate position image GF1 to be the selected first candidate position image GF2 among the first candidate position images GF1 in the operation valid region ED1 each time.

Figure 9:
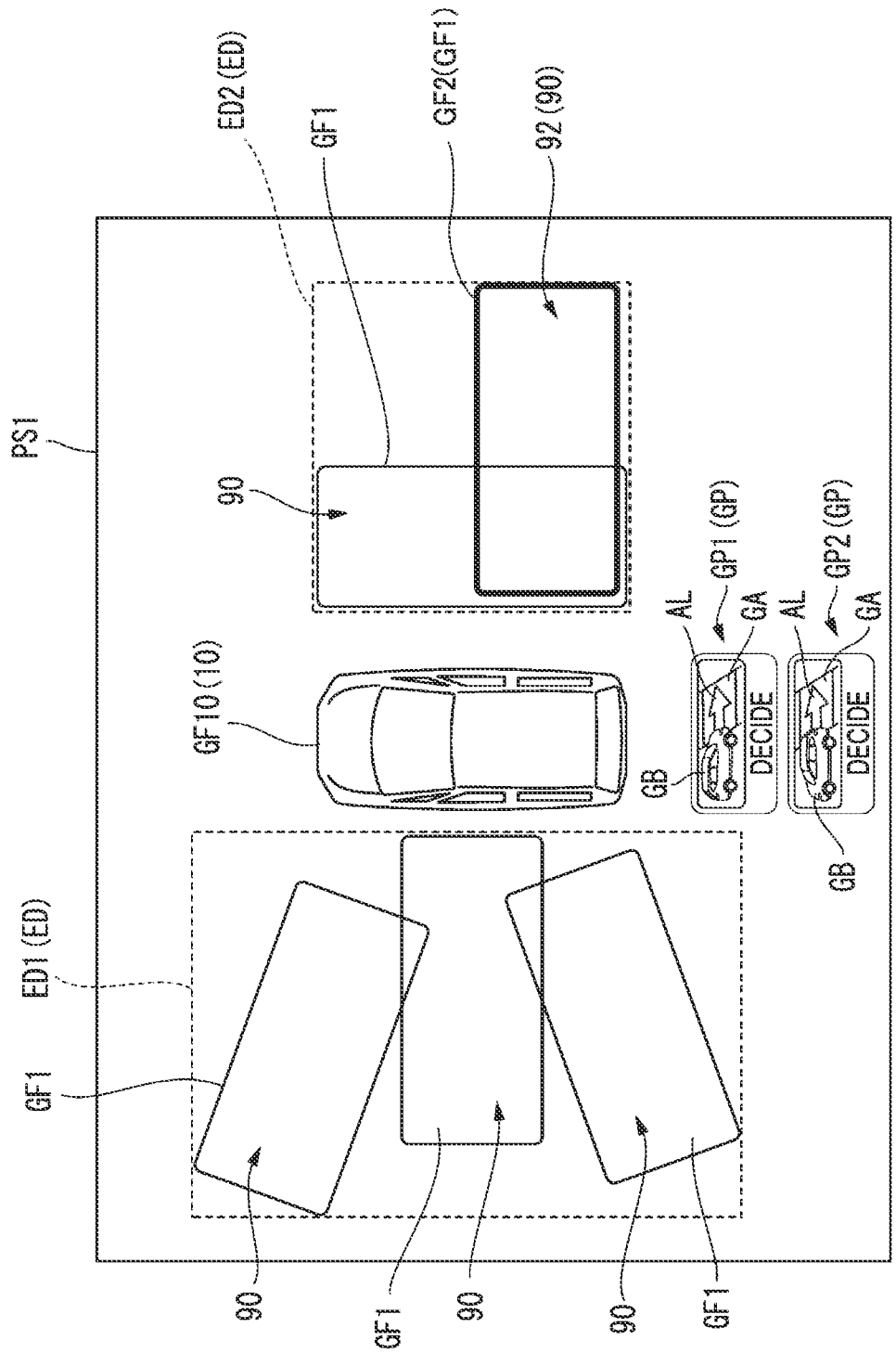
FIG. 9 shows the example of the bird eye view image and the operation valid region in the first mode (part 3).

On the other hand, for example, in the state shown in FIG. 7, it is assumed that there is an operation performed on the operation valid region ED2 on the right side. In this case, in the process of step S8, as shown in FIG. 9, the control device 20 changes the selected first candidate position image GF2 to one of the first candidate position images GF1 in the operation valid region ED2 (in the shown example, the first candidate position image GF1 indicating the parking available position 90 extending toward the right of the vehicle 10). Accordingly, the user can switch the first candidate position image GF1 that can be selected as the selected first candidate position image GF2 from the first candidate position image within the operation valid region ED1 to the first candidate position image within the operation valid region ED2.

Then, in the state shown in FIG. 9, when there is an operation performed on the operation valid region ED2, the control device 20 changes the selected first candidate position image GF2 to another first candidate position image GF1 in the operation valid region ED2 in the process of step S8. That is, when an operation is performed on the operation valid region ED2 in a state in which one of the first candidate position images GF1 in the operation valid region ED2 is the selected first candidate position image GF2, the control device 20 sequentially switches the first candidate position image GF1 to be the selected first candidate position image GF2 among the first candidate position images GF1 in the operation valid region ED2 each time.

In this way, when there is an operation performed on the operation valid region ED1 on the left side, the selected first candidate position image GF2 is sequentially switched among the plurality of first candidate position images GF1 on the left side, and when there is an operation performed on the operation valid region ED2 on the right side, the selected first candidate position image GF2 is sequentially switched among the plurality of first candidate position images GF1 on the right side. Therefore, even when a plurality of first candidate position images GF1 are displayed in an overlapped manner on the left and right sides of the vehicle 10 (own vehicle image GF10) in the bird eye view image PS1, the first candidate position image GF1 unwanted by the user is prevented from being selected as the selected first candidate position image GF2, and thus selection of the desired first candidate position image GF1 is facilitated. For example, when the user intends to select one of the first candidate position images GF1 on the left side, the first candidate position images GF1 on the right side are not selected as long as the user performs an operation on the operation valid region ED1 on the left side. Therefore, the first candidate position images GF1 on the right side unwanted by the user are prevented from being selected, and thus it is possible to easily select one of the first candidate position images GF1 on the left side.

In addition, by sequentially changing the selected first candidate position image GF2 among the plurality of first candidate position images GF1 in the operation valid region ED each time an operation is performed on the operation valid region ED, the user can reliably select the desired first candidate position image GF1 by adjusting the number of times of operations performed on the operation valid region ED.

Although the selected first candidate position image GF2 is sequentially changed among the plurality of first candidate position images GF1 in the operation valid region ED each time an operation is performed on the operation valid region ED herein, the present disclosure is not limited thereto. For example, a configuration may be adopted in which the control device 20 changes the first candidate position image GF1 to be the selected first candidate position image GF2 to the first candidate position image GF1 closest to an operation position among the first candidate position images GF1 in the operation valid region ED when there is an operation performed on the operation valid region ED. Here, the first candidate position image GF1 closest to the operation position may be the first candidate position image GF1 whose center position is closest to the operation position, or may be the first candidate position image GF1 whose one side is closest to the operation position. Accordingly, the user can select the first candidate position image GF1 in a manner that is easy for the user to intuitively understand.

In addition, for example, when the selected first candidate position image GF2 is changed, the control device 20 changes the viewpoint position of the direction image PS2 such that the direction represented by the direction image PS2 becomes a direction in which the parking available position 90 indicated by the changed selected first candidate position image GF2 is present. Accordingly, the direction image PS2 changes so as to represent a landscape in the direction in which the parking available position 90 indicated by the changed selected first candidate position image GF2 is present. Accordingly, it is possible to guide the user in an intuitive and easy-to-understand manner to the landscape in the direction in which the parking available position 90 that is the target parking position 92 is present.

In addition, when the selected first candidate position image GF2 is displayed by executing the process of step S6 or step S8, the control device 20 displays, on the touch panel 42, the parking pattern image GP corresponding to the parking available position 90 indicated by the selected first candidate position image GF2 (step S9).

For example, as shown in FIG. 7, it is assumed that the parking available position 90 indicated by the selected first candidate position image GF2 is the parking available position 90 where forward parking and backward parking are both possible (parallel parking is not possible). In this case, the control device 20 displays the parking pattern image GP1 indicating the forward parking pattern and the parking pattern image GP2 indicating the backward parking pattern as the parking pattern image GP. In this case, by performing an operation (touching) on the displayed parking pattern image GP1, the user can set the parking available position 90 indicated by the selected first candidate position image GF2 as the target parking position 92 and instruct the control device 20 to perform forward parking toward the target parking position 92. In addition, in this case, when the user performs an operation on the displayed parking pattern image GP2, the user can set the parking available position 90 indicated by the selected first candidate position image GF2 as the target parking position 92 and instruct the control device 20 to perform backward parking toward the target parking position 92.

On the other hand, as shown in FIG. 8, it is assumed that the parking available position 90 indicated by the selected first candidate position image GF2 is the parking available position 90 where only backward parking is possible. In this case, although the control device 20 displays the parking pattern image GP1 and the parking pattern image GP2 as the parking pattern image GP in the same manner as the example shown in FIG. 7, the parking pattern image GP1 representing the inexecutable parking pattern is displayed with, for example, lower lightness than the parking pattern image GP2 representing the executable parking pattern. In this case, even if there is an operation performed on the parking pattern image GP1 representing the inexecutable parking pattern (that is, the parking pattern image displayed with low lightness), the control device 20 does not receive the operation. In this way, the control device 20 displays in such a manner that the parking pattern image (here, the parking pattern image GP2) representing the executable parking pattern in distinguished from the parking pattern image (here, the parking pattern image GP1) representing the inexecutable parking pattern. Instead of or in addition to the lightness, for example, the control device 20 may make transmittance of the parking pattern image representing the executable parking pattern and transmittance of the parking pattern image representing the inexecutable parking pattern different from each other. In this way, the parking pattern image representing the executable parking pattern and the parking pattern image representing the inexecutable parking pattern can still be displayed in a distinguishable manner. Further, for example, the control device 20 may display a mark indicating that selection is not possible (for example, a mark indicating "NG") on the parking pattern image indicating the inexecutable parking pattern so as to distinguish between the parking pattern image indicating the executable parking pattern and the parking pattern image indicating the inexecutable parking pattern.

Figure 10:
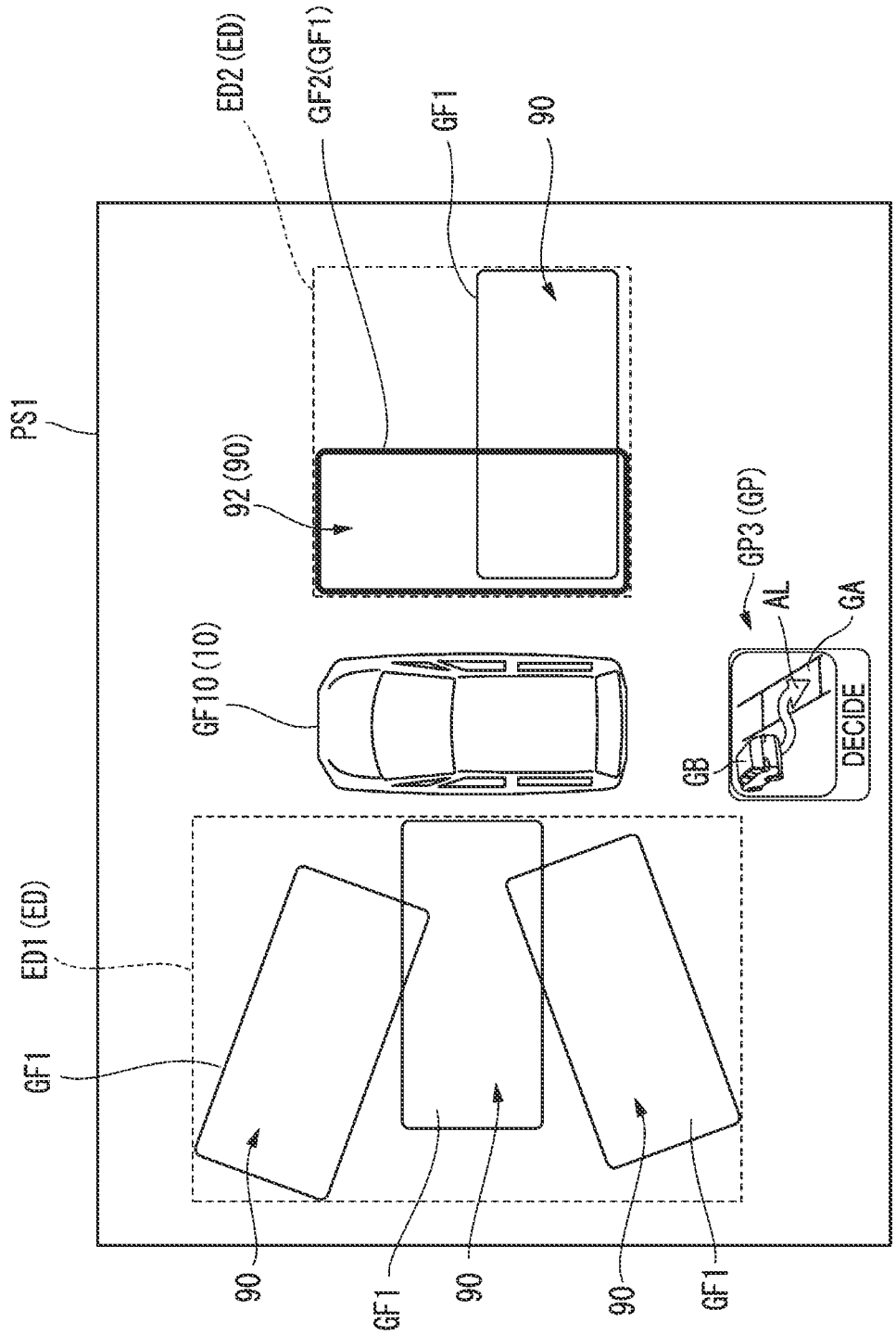
FIG. 10 shows the example of the bird eye view image and the operation valid region in the first mode (part 4).

In addition, as shown in FIG. 10, it is assumed that the parking available position 90 indicated by the selected first candidate position image GF2 is the parking available position 90 where only parallel parking is possible. In this case, the control device 20 displays the parking pattern image GP3 indicating the parallel parking pattern as the parking pattern image GP. In this case, the parking pattern image GP1 and the parking pattern image GP2 are not displayed, and only the parking pattern image GP3 is displayed in a large size.

In this way, the control device 20 can guide the user to the parking pattern by displaying the parking pattern image GP indicating the parking pattern executable when the parking available position 90 indicated by the selected first candidate position image GF2 is set as the target parking position 92. Therefore, the user can grasp the parking pattern when the vehicle 10 moves to the target parking position 92 specified by the user.

In addition, when the parking pattern executable for the parking available position 90 indicated by the selected first candidate position image GF2 is the parallel parking pattern, the control device 20 displays the parking pattern image GP3 indicating the parallel parking pattern in a display size different from a display size of the parking pattern image GP1 indicating the forward parking pattern and the parking pattern image GP2 indicating the backward parking pattern (for example, the parking pattern image GP3 is displayed in a large size). Accordingly, when the parking available position 90 indicated by the selected first candidate position image GF2 is set as the target parking position 92, the user can be guided in an easy-to-understand manner that the vehicle 10 is to be parked by parallel parking toward the target parking position 92.

In addition, by displaying the parking pattern image GP representing the parking pattern that cannot be executed for the parking available position 90 indicated by the selected first candidate position image GF2 in an unselectable state, the user can be guided to the unselectable parking pattern image GP, and thus the parking pattern indicated by the parking pattern image GP can be prevented from being selected.

As described above, the parking pattern image GP includes the first image GA representing the parking available position 90 indicated by the selected first candidate position image GF2, the second image GB representing the vehicle 10, and the third image AL representing the route of the vehicle 10. In the process of step S9, the control device 20 displays the parking pattern image GP in which the first image GA and the second image GB are arranged at positions corresponding to a positional relationship between the vehicle 10 and the parking available position 90 indicated by the selected first candidate position image GF2.

For example, in the state shown in FIG. 7, the parking available position 90 indicated by the selected first candidate position image GF2 is present on the left side of the vehicle 10. In this way, when the parking available position 90 indicated by the selected first candidate position image GF2 is present on the left side of the vehicle 10, as shown in FIG. 7, the control device 20 displays the parking pattern image GP in which the first image GA is arranged on a left side of the second image GB. In this case, the second image GB of the parking pattern image GP1 indicating the forward parking pattern represents vehicle 10 facing leftward. Further, the third image AL of the parking pattern image GP1 is an image of an arrow extending from the second image GB (the vehicle 10 facing leftward) toward the first image GA arranged on the left side of the second image GB. In addition, in this case, the second image GB of the parking pattern image GP2 indicating the backward parking pattern represents the vehicle 10 facing rightward. Further, the third image AL of the parking pattern image GP2 is an image of an arrow extending from the second image GB (the vehicle 10 facing rightward) toward the first image GA arranged on the left side of the second image GB.

On the other hand, in the state shown in FIG. 9, the parking available position 90 indicated by the selected first candidate position image GF2 is present on the right side of the vehicle 10. In this way, when the parking available position 90 indicated by the selected first candidate position image GF2 is present on the right side of the vehicle 10, as shown in FIG. 9, the control device 20 displays the parking pattern image GP that is left-right inverted as compared with the parking pattern image GP shown in FIG. 7.

In this way, by displaying the parking pattern image GP in which the first image GA and the second image GB are arranged at the positions corresponding to the positional relationship between the vehicle 10 and the parking available position 90 indicated by the selected first candidate position image GF2, it is possible to display the parking pattern image GP that suits a sense of the user, and thus it is possible to prevent a sense of discomfort from being given to the user due to the displayed parking pattern image GP.

After executing the process of step S9, the control device 20 determines whether there is an instruction to start parking, that is, an operation performed on one of the parking pattern images GP (step S10). When it is determined that there is no instruction to start parking (step S10: No), the control device 20 returns to the process of step S1. On the other hand, when it is determined that there is an instruction to start parking (step S10: Yes), the control device 20 sets the parking available position 90 indicated by the selected first candidate position image GF2 as the target parking position 92, moves the vehicle to the target parking position 92 by automatic steering (that is, automatically parks the vehicle) according to the parking pattern indicated by the selected parking pattern image GP (step S11), and ends the series of processes.

In addition, in step S0 shown in FIG. 6, when it is determined that the second mode button Bn1 is operated (step S0: Yes), the control device 20 switches the mode related to the parking assistance from the first mode to the second mode, and executes a predetermined second mode process.

[Second Mode Process]

Figure 11:
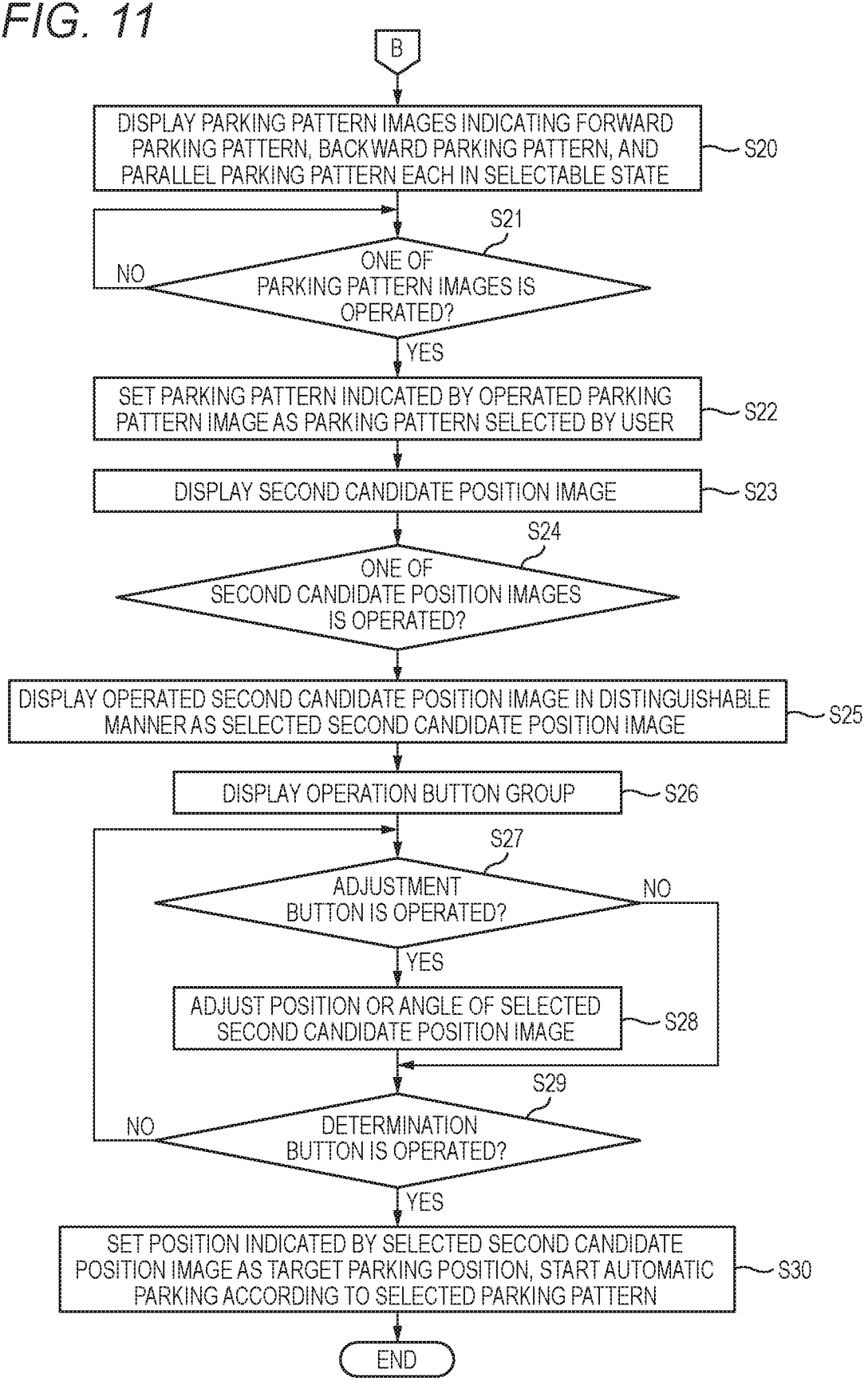
FIG. 11 is a flowchart showing an example of a second mode process.

Here, an example of the second mode process executed by the control device 20 will be described with reference to FIGS. 12 to 14 according to a flowchart shown in FIG. 11. As shown in FIG. 11, in the second mode process, the control device 20 first displays, on the touch panel 42, the parking pattern image GP1 indicating the forward parking pattern, the parking pattern image GP2 indicating the backward parking pattern, and the parking pattern image GP3 indicating the parallel parking pattern each in a selectable state (step S20). By the process of step S20, the control device 20 displays, for example, the parking assistance screen PS as shown in FIG. 12 on the touch panel 42.

Figure 12:
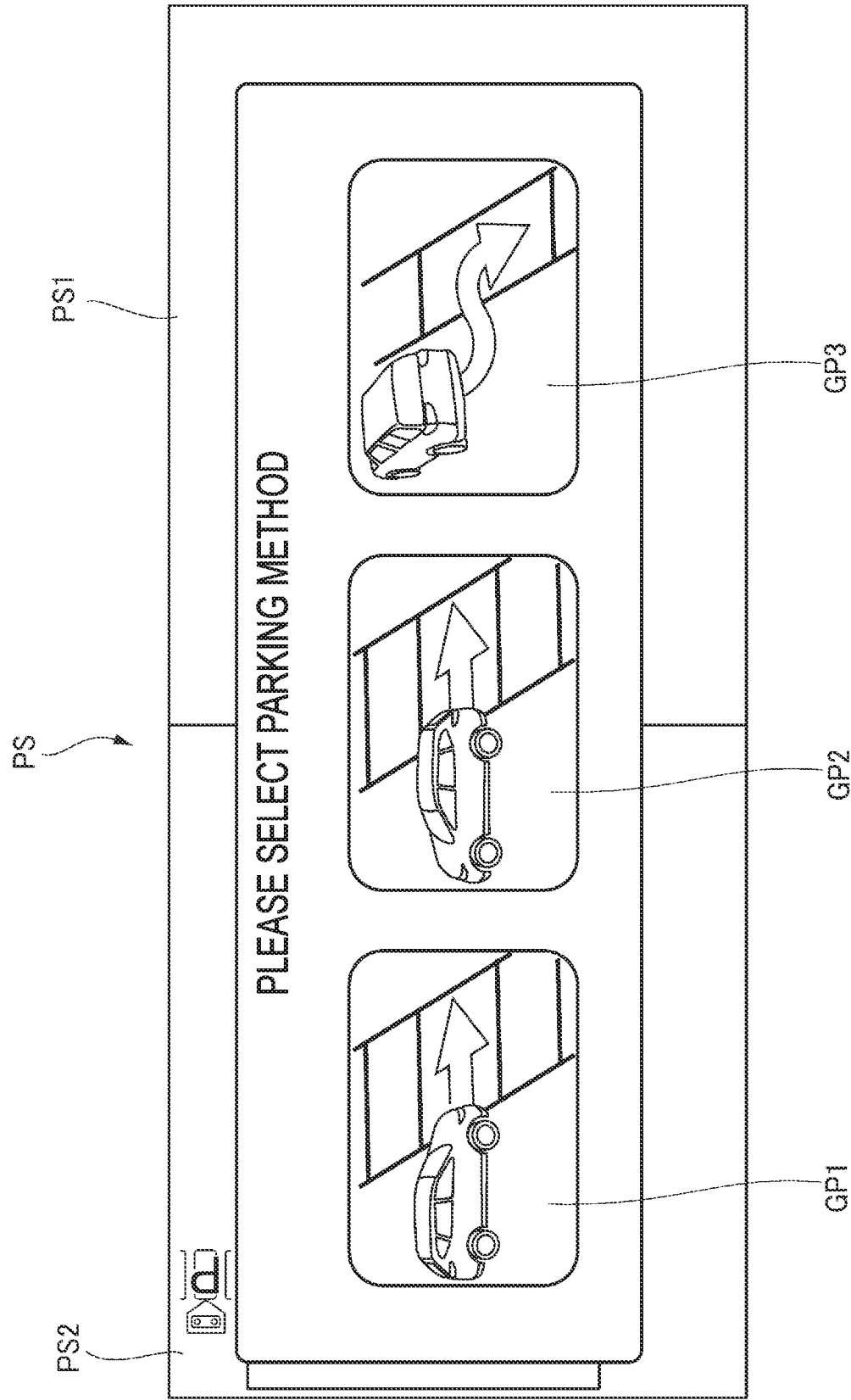
FIG. 12 shows an example of a parking assistance screen displayed in a second mode.

In the parking assistance screen PS shown in FIG. 12, the parking pattern image GP1, the parking pattern image GP2, and the parking pattern image GP3 are arranged side by side in this order from the left in the left-right direction, and are displayed each in a selectable state. In addition, above the parking pattern image GP1, the parking pattern image GP2, and the parking pattern image GP3, a message "please select a parking method" is displayed. By displaying such a parking assistance screen PS, the user can select a desired parking pattern.

Next, the control device 20 stands by until the user performs an operation on one of the parking pattern images displayed by the process of step S20 (step S21: No). Then, when an operation is performed on one of the parking pattern images (step S21: Yes), the control device 20 sets the parking pattern indicated by the operated parking pattern image as the parking pattern selected by the user (step S22).

Next, the control device 20 displays, on the touch panel 42, the second candidate position image GF21 for manually setting the target parking position (step S23). At this time, the control device 20 displays the second candidate position image GF21 at a position corresponding to the parking pattern selected by the user at an angle corresponding to the parking pattern. For example, when the forward parking pattern or the backward parking pattern is selected, as shown in FIG. 13, the control device 20 displays one second candidate position images GF21 whose longitudinal direction is orthogonal to a longitudinal direction of the own vehicle image GF10 on each of the left and right sides of the own vehicle image GF10 in the bird eye view image PS1. In addition, when the parallel parking pattern is selected, as shown in FIG. 14, the control device 20 displays one second candidate position images GF21 whose longitudinal direction is parallel to the longitudinal direction of the own vehicle image GF10 on each of the left and right sides of the own vehicle image GF10 in the bird eye view image PS1.

Here, although one second candidate position image GF21 is displayed on each of the left and right sides of the own vehicle image GF10, the present disclosure is not limited thereto. For example, one second candidate position image GF21 may be displayed on only one of the left side and the right side of the own vehicle image GF10. In addition, in this case, the second candidate position image GF21 may be displayed in the form of a selected second candidate position image GF22 to be described later from the beginning.

Next, the control device 20 stands by until the user performs an operation on one of the second candidate position images GF21 displayed by the process of step S23 (step S24: No). Then, when an operation is performed on one of the second candidate position images GF21 (step S24: Yes), the control device 20 highlights the operated (that is, selected) second candidate position image GF21 as the selected second candidate position image GF22 that is a frame image representing a place set as the target parking position, and thus displays the selected second candidate position image GF22 in a manner distinguished from the other second candidate position images GF21 (step S25).

Examples of modes of highlighting the selected second candidate position image GF22 include, as shown in FIGS. 13 and 14, a mode in which a thickness of an outline of the selected second candidate position image GF22 is made thicker than that of the other second candidate position images GF21, and a mode in which a display color of the outline of the selected second candidate position image GF22 is made different from a display color of the other first candidate position images GF1.

Further, as shown in FIGS. 13 and 14, the control device 20 displays, according to the selected second candidate position image GF22, a parking-time own vehicle image GF11 indicating the vehicle 10 whose orientation corresponds to the parking pattern selected by the user. That is, the control device 20 displays, on the touch panel 42, the parking-time own vehicle image GF11 indicating the vehicle 10 when parking at the position indicated by the selected second candidate position image GF22 according to the parking pattern selected by the user. By displaying such a parking-time own vehicle image GF11, it is possible to guide the user in an intuitively easy-to-understand manner about what will happen if the vehicle 10 is parked at the position indicated by the selected second candidate position image GF22 according to the parking pattern selected by the user.

Next, the control device 20 displays, on the touch panel 42, the operation button group Bn10 configured to adjust the position or angle of the selected second candidate position image GF22 (step S26). At this time, for example, as shown in FIGS. 13 and 14, the control device 20 displays the operation button group Bn10 below a position where the own vehicle image GF10 of the bird eye view image PS1 is displayed. Accordingly, the operation button group Bn10 can be displayed in such a manner that a limited display region of the touch panel 42 is effectively utilized.

For example, as shown in FIGS. 13 and 14, the operation button group Bn10 displayed by the process of step S26 includes an up button Bn10a, a down button Bn10b, a left button Bn10c, a right button Bn10d, a left rotation button Bn10e, a right rotation button Bn10f, a determination button Bn10g, and a reset button Bn10h. As shown in FIGS. 13 and 14, by displaying these buttons as centrally as possible, it is possible to reduce an amount of movement of a hand of the user when performing an operation using these buttons. Hereinafter, the up button Bn10a, the down button Bn10b, the left button Bn10c, the right button Bn10d, the left rotation button Bn10e, the right rotation button Bn10f, and the reset button Bn10h are collectively referred to as "adjustment buttons".

Next, the control device 20 determines whether the user operates the adjustment button (step S27). When no operation is performed on the adjustment button (step S27: No), the control device 20 proceeds to the process of step S29. On the other hand, when the adjustment button is operated (step S27: Yes), the control device 20 adjusts the position or angle of the selected second candidate position image GF22 according to the operated adjustment button (step S28).

For example, when the up button Bn10a is operated, the control device 20 translates the selected second candidate position image GF22 upward by a predetermined amount on the display screen of the touch panel 42. Similarly, the control device 20 translates the selected second candidate position image GF22 downward by a predetermined amount when the down button Bn10b is operated, translates the selected second candidate position image GF22 leftward by a predetermined amount when the left button Bn10c is operated, and translates the selected second candidate position image GF22 rightward by a predetermined amount when the right button Bn10d is operated. In addition, when the left rotation button Bn10e is operated, the control device 20 rotates the selected second candidate position image GF22 counterclockwise by a predetermined angle on the display screen of the touch panel 42 with a center point of the selected second candidate position image GF22 serving as an axis. Similarly, when the right rotation button Bn10f is operated, the control device 20 rotates the selected second candidate position image GF22 clockwise by a predetermined angle. In addition, when the reset button Bn10h is operated, the control device 20 returns the selected second candidate position image GF22 to an initial position where the selected second candidate position image GF22 is initially displayed by the process of step S23.

Next, the control device 20 determines whether the user operates the determination button Bn10g (step S29). When no operation is performed on the determination button Bn10g (step S29: No), the control device 20 returns to the process of step S27. On the other hand, when the determination button Bn10g is operated (step S29: Yes), the control device 20 sets the position indicated by the selected second candidate position image GF22 as the target parking position, moves (that is, automatically parks) the vehicle to the target parking position by automatic steering according to the parking pattern indicated by the selected parking pattern image GP (step S30), and ends the series of processes.

As described above, according to the control device 20, it is possible to switch between the first mode and the second mode according to the operation of the user. In the first mode, the selection of the parking pattern when parking at the target parking position can be received after receiving the specification of the target parking position, and, in the second mode, the specification of the target parking position to be parked according to the parking pattern can be received after receiving the selection of the parking pattern. Accordingly, the user can change a determination order of the target parking position and the parking pattern when parking at the target parking position, and thus user convenience can be improved.

In addition, according to the control device 20, in the first mode, it is possible to receive the specification of the parking available position to be the target parking position from among the parking available positions detected based on the detection result of the sensor group 16 provided in the vehicle 10. Accordingly, the user can specify a desired parking available position as the target parking position from among the detected parking available positions. Then, according to the control device 20, after the specification of the parking available position to be the target parking position is received, it is possible to receive the selection of the parking pattern when parking with the parking available position serving as the target parking position from among the parking patterns that can be selected according to the parking available position. Accordingly, it is possible to park at the parking available position according to an appropriate parking pattern corresponding to the parking available position specified as the target parking position.

In addition, according to the control device 20, it is possible to detect, as the parking available position, at least one of a place partitioned as a parking space, a place set as the parking available position by the user, and a place where the vehicle 10 can be physically parked. Accordingly, it is possible to detect a place suitable for parking the vehicle 10 as the parking available position.

In addition, according to the control device 20, in the second mode, it is possible to receive the selection of the parking pattern from among the forward parking pattern, the backward parking pattern, and the parallel parking pattern. Accordingly, in the second mode, the user can select a desired parking pattern from all the parking patterns executable by the vehicle 10.

In addition, according to the control device 20, when the selection of the parking pattern is received in the second mode, the selected second candidate position image GF22 indicating the place set as the target parking position can be displayed on the touch panel 42. Then, the parking-time own vehicle image GF11 indicating the vehicle 10 whose orientation corresponds to the selected parking pattern can be displayed according to the selected second candidate position image GF22. Accordingly, it is possible to guide the user in an intuitively easy-to-understand manner about what will happen if the vehicle 10 is parked at the place indicated by the selected second candidate position image GF22.

Incidentally, in a public parking lot, for example, an orientation (in other words, a parking pattern) when a vehicle is parked may be defined in advance by an administrator of the parking lot, such as "only forward parking is allowed". In such a parking lot in which the parking pattern is defined, when the parking assistance in the first mode is performed, the parking pattern defined in the parking lot may not be included in parking patterns that can be selected for the vehicle 10 with respect to the parking available position (candidate position) specified as the target parking position by the user. In other words, the user may be guided (proposed) to a parking available position that does not match the parking pattern defined in the parking lot (a parking available position that actually cannot be specified as the target parking position) as the parking available position that can be specified as the target parking position. If the parking available position specified as the target parking position by the user does not match the parking pattern defined in the parking lot, labor of the user, such as re-specifying another parking available position as the target parking position, is increased.

Therefore, in such a parking lot in which the parking pattern is defined, the user desires to perform parking assistance in the second mode in which the parking pattern can be selected first. On the other hand, in a parking lot in which the parking pattern is not particularly defined, the user desires to perform parking assistance in the first mode in which the target parking position can be specified from among as many parking available positions as possible. In this regard, as described above, since the control device 20 can switch between the first mode and the second mode according to the operation of the user, the parking assistance can be performed in an appropriate mode according to a situation such as a parking lot in which the vehicle 10 is parked. Accordingly, it is possible to improve user convenience.

Although the embodiment of the present disclosure has been described above with reference to the accompanying drawings, it is needless to say that the present disclosure is not limited to the embodiment. It is apparent that those skilled in the art can conceive of various modifications and alterations within the scope described in the claims, and it is understood that such modifications and alterations naturally fall within the technical scope of the present disclosure. In addition, the respective constituent elements in the above embodiment may be combined as desired without departing from the gist of the present disclosure.

For example, although an example in which the operation valid region ED including the plurality of first candidate position images GF1 is provided when the plurality of first candidate position images GF1 are displayed in the overlapped manner has been described in the above embodiment, the present disclosure is not limited thereto. If the plurality of first candidate position images GF1 are to some extent densely arranged without overlapping each other, it is conceived that it is difficult for the user to select the desired first candidate position image GF1 as in the case where the first candidate position images GF1 overlap each other. Therefore, the control device 20 may provide the operation valid region ED including the plurality of first candidate position images GF1 not only in the case where the plurality of first candidate position images GF1 are displayed in the overlapped manner but also in the case where the plurality of first candidate position images GF1 are to some extent densely (that is, at high density) displayed. The manufacturer of the vehicle 10 or the control device 20 can appropriately determine how densely the plurality of first candidate position images GF1 should be displayed to provide the operation valid region ED including the first candidate position images GF1.

In addition, although an example in which the moving object in the present disclosure is the vehicle 10 that is a four-wheeled automobile has been described in the embodiment described above, the present disclosure is not limited thereto. The moving object in the present disclosure may be a two-wheeled automobile (so-called motorcycle), or may be a Segway (registered trademark), a ship, an aircraft, or the like.

In the present specification, at least the following matters are described. It should be noted that although the corresponding constituent elements and the like in the above-described embodiment are shown in parentheses, the present disclosure is not limited thereto.

(1) A control device (control device 20) configured to control a moving object (vehicle 10) that is moved by automatic steering to a target position specified by a user, the moving object being configured to be movable according to a plurality of types of movement patterns, and moving according to a movement pattern selected by the user from among the plurality of types of movement patterns when moving to the target position, in which:

the control device has a first mode and a second mode, and is configured to be switchable between the first mode and the second mode according to an operation of the user;

in the first mode, the control device receives selection of the movement pattern after receiving specification of the target position; and in the second mode, the control device receives the specification of the target position after receiving the selection of the movement pattern.

According to (1), it is possible to switch between the first mode and the second mode according to the operation of the user. In the first mode, the selection of the movement pattern can be received after receiving the specification of the target position, and, in the second mode, the specification of the target position can be received after receiving the selection of the movement pattern. Accordingly, the user can change a determination order of the target position and the movement pattern when moving toward the target position, and thus user convenience can be improved.

(2) The control device according to (1), in which
in the first mode, the control device:
detects candidate positions (parking available position 90) that are candidates of the target position based on a detection result of an external sensor (sensor group 16) provided in the moving object;
receives specification of a candidate position to be the target position from among the detected candidate positions; and
receives selection of the movement pattern from among movement patterns selectable according to the candidate position after receiving the specification of the candidate position to be the target position.

According to (2), in the first mode, it is possible to receive the specification of the candidate position to be the target position from among the candidate positions detected based on the detection result of the external sensor provided in the moving object. Accordingly, the user can specify a desired candidate position as the target position from among the detected candidate positions. According to (2), it is possible to receive the selection of the movement pattern when moving with the candidate position serving as the target position from among the movement patterns selectable according to the candidate position after receiving the specification of the candidate position to be the target position. Accordingly, it is possible to move to the candidate position according to an appropriate movement pattern corresponding to the candidate position specified as the target position.

(3) The control device according to (2), in which
the candidate position is at least one of a place partitioned as a parking space, a place set as the candidate position by the user, and a place where the moving object is physically parkable.

According to (3), it is possible to detect a place suitable for parking the moving object as the candidate position.

(4) The control device according to any one of (1) to (3), in which
the plurality of types of movement patterns include:
a first movement pattern in which the moving object is parked forward at the target position;
a second movement pattern in which the moving object is parked backward at the target position; and
a third movement pattern in which the moving object is parked parallelly at the target position, and
in the second mode, the control device receives selection of the movement pattern from among the first movement pattern, the second movement pattern, and the third movement pattern.

According to (4), in the second mode, the user can select a desired movement pattern from the first movement pattern, the second movement pattern, and the third movement pattern.

(5) The control device according to any one of (1) to (4), in which
when the selection of the movement pattern is received in the second mode, the control device displays a frame image (selected second candidate position image GF22) indicating a place set as the target position on a display device (touch panel 42) of the moving object, and displays an image (parking-time own vehicle image GF11) indicating the moving object whose orientation corresponds to the selected movement pattern according to the frame image.

According to (5), it is possible to guide the user in an intuitively easy-to-understand manner about what will happen if the moving object is parked at the place indicated by the frame image.

(6) A moving object including:
the control device according to any one of (1) to (5), in which
the moving object is configured to be moved by automatic steering to the target position specified by the user, and
the moving object is configured to be movable according to the plurality of types of movement patterns, and moves according to the movement pattern selected by the user from among the plurality of types of movement patterns when moving to the target position.

According to (6), it is possible to switch between the first mode and the second mode according to the operation of the user. In the first mode, the selection of the movement pattern can be received after receiving the specification of the target position, and, in the second mode, the specification of the target position can be received after receiving the selection of the movement pattern. Accordingly, the user can change the determination order of the target position and the movement pattern when moving toward the target position, and thus user convenience can be improved.

The invention claimed is:

1. A control device configured to control a moving object that is moved by automatic steering to a target position specified by a user, the moving object being configured to be movable according to a plurality of types of movement patterns, and moving according to a movement pattern selected by the user from among the plurality of types of movement patterns when moving to the target position, wherein:
the control device has a first mode and a second mode, and is configured to be switchable between the first mode and the second mode according to an operation of the user;
in the first mode, the control device receives selection of the movement pattern after receiving specification of the target position;
in the second mode, the control device receives the specification of the target position after receiving the selection of the movement pattern;
in the second mode, the control device displays an executable parking pattern and an inexecutable parking pattern so as to distinguish therebetween; and
the control device is implemented via at least one processor.

2. The control device according to claim 1, wherein
in the first mode, the control device:
detects candidate positions that are candidates of the target position based on a detection result of an external sensor provided in the moving object;
receives specification of a candidate position to be the target position from among the detected candidate positions; and
receives selection of the movement pattern from among movement patterns selectable according to the candidate position after receiving the specification of the candidate position to be the target position.

3. The control device according to claim 2, wherein
the candidate position is at least one of a place partitioned as a parking space, a place set as the candidate position by the user, and a place where the moving object is physically parkable.

4. The control device according to claim 1, wherein:
the plurality of types of movement patterns include:
- a first movement pattern in which the moving object is parked forward at the target position;
- a second movement pattern in which the moving object is parked backward at the target position; and
- a third movement pattern in which the moving object is parked parallelly at the target position; and in the second mode, the control device receives selection of the movement pattern from among the first movement pattern, the second movement pattern, and the third movement pattern.

5. The control device according to claim 1, wherein
when the selection of the movement pattern is received in the second mode, the control device displays a frame image indicating a place set as the target position on a display device of the moving object, and displays an image indicating the moving object whose orientation corresponds to the selected movement pattern according to the frame image.

6. A moving object comprising:
a control device configured to control the moving object that is moved by automatic steering to a target position specified by a user, the moving object being configured to be movable according to a plurality of types of movement patterns, and moving according to a movement pattern selected by the user from among the plurality of types of movement patterns when moving to the target position, wherein:

the control device has a first mode and a second mode, and is configured to be switchable between the first mode and the second mode according to an operation of the user;

in the first mode, the control device receives selection of the movement pattern after receiving specification of the target position;

in the second mode, the control device receives the specification of the target position after receiving the selection of the movement pattern;

the moving object is configured to be moved by automatic steering to the target position specified by the user;

the moving object is configured to be movable according to the plurality of types of movement patterns, and moves according to the movement pattern selected by the user from among the plurality of types of movement patterns when moving to the target position;

in the second mode, the control device displays an executable parking pattern and an inexecutable parking pattern so as to distinguish therebetween; and the control device is implemented via at least one processor.

7. The control device according to claim 1, wherein
in the second mode, the control device does not receive an operation with respect to the inexecutable parking pattern.

* * * * *